United States Patent
Liu et al.

(10) Patent No.: US 12,125,394 B2
(45) Date of Patent: *Oct. 22, 2024

(54) OPEN PLATFORM FOR FLIGHT RESTRICTED REGION

(71) Applicant: SZ DJI TECHNOLOGY CO., LTD., Shenzhen (CN)

(72) Inventors: Weifeng Liu, Shenzhen (CN); Jian Zhao, Shenzhen (CN); Yulong Deng, Shenzhen (CN); Nanning Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,746

(22) Filed: Sep. 9, 2022

(65) Prior Publication Data
US 2023/0045977 A1 Feb. 16, 2023

Related U.S. Application Data

(63) Continuation of application No. 17/523,859, filed on Nov. 10, 2021, now Pat. No. 11,482,121, which is a
(Continued)

(51) Int. Cl.
*G08G 5/00* (2006.01)
*B64C 39/02* (2023.01)
(Continued)

(52) U.S. Cl.
CPC .......... *G08G 5/006* (2013.01); *B64C 39/024* (2013.01); *G08G 5/0013* (2013.01);
(Continued)

(58) Field of Classification Search
CPC .......... G08G 5/00; G08G 5/006; G08G 5/013; G08G 5/026; G08G 23/00; B64C 39/02; G01C 21/00; G05D 1/08
See application file for complete search history.

(56) References Cited

U.S. PATENT DOCUMENTS

| 4,862,373 A | 8/1989 | Meng |
| 5,631,640 A | 5/1997 | Deis et al. |
(Continued)

FOREIGN PATENT DOCUMENTS

| CN | 1222969 A | 7/1999 |
| CN | 1222970 A | 7/1999 |
(Continued)

OTHER PUBLICATIONS

European Patent Office, Summons to Oral Proceedings, EP Patent Application 19198007.7, mailed Nov. 4, 2022, 13 pages.
(Continued)

*Primary Examiner* — Tan Q Nguyen
(74) *Attorney, Agent, or Firm* — ANOVA LAW GROUP, PLLC

(57) ABSTRACT

A system for collecting information regarding a flight restriction region includes one or more processors and a non-transitory computer readable storage medium storing instructions that, when executed by the one or more processors, cause the one or more processors to individually or collectively receive an input specifying a location of the flight restriction region from a user via a user input device, obtain information associated with the flight restriction region from one or more external data sources based on the location, and determine a space of the flight restriction region based on the information associated with the flight restriction region.

20 Claims, 13 Drawing Sheets

Related U.S. Application Data continuation of application No. 16/942,096, filed on Jul. 29, 2020, now Pat. No. 11,488,487, which is a continuation of application No. 16/198,382, filed on Nov. 21, 2018, now Pat. No. 10,733,895, which is a continuation of application No. 15/360,371, filed on Nov. 23, 2016, now Pat. No. 10,147,329, which is a continuation of application No. PCT/CN2015/075627, filed on Mar. 31, 2015.

(51) Int. Cl.
  *H04W 4/021* (2018.01)
  *H04W 12/08* (2021.01)
  *G01C 21/00* (2006.01)
  *H04W 12/06* (2021.01)
  *H04W 12/63* (2021.01)
  *H04W 12/64* (2021.01)

(52) U.S. Cl.
  CPC ......... *G08G 5/0026* (2013.01); *G08G 5/0069* (2013.01); *H04W 4/021* (2013.01); *H04W 12/08* (2013.01); *G08G 5/0034* (2013.01); *H04W 12/06* (2013.01); *H04W 12/63* (2021.01); *H04W 12/64* (2021.01)

(56) References Cited

U.S. PATENT DOCUMENTS

| | | | |
|---|---|---|---|
| 6,029,102 A * | 2/2000 | Elsman | B60R 25/104 |
| | | | 701/1 |
| 6,064,939 A | 5/2000 | Nishida et al. | |
| 6,097,996 A | 8/2000 | Deker | |
| 6,289,277 B1 | 9/2001 | Feyereisen et al. | |
| 6,650,972 B1 | 11/2003 | Robinson et al. | |
| 6,675,095 B1 | 1/2004 | Bird et al. | |
| 6,708,091 B2 | 3/2004 | Tsao | |
| 6,718,235 B1 | 4/2004 | Borugian | |
| 7,164,986 B2 * | 1/2007 | Humphries | B60R 25/00 |
| | | | 340/426.22 |
| 7,194,353 B1 | 3/2007 | Baldwin et al. | |
| 7,228,232 B2 | 6/2007 | Bodin et al. | |
| 7,231,294 B2 | 6/2007 | Bodin et al. | |
| 7,512,462 B2 | 3/2009 | Nichols et al. | |
| 7,606,115 B1 | 10/2009 | Cline et al. | |
| 7,734,387 B1 | 6/2010 | Young et al. | |
| 7,737,878 B2 | 6/2010 | Van et al. | |
| 8,082,102 B2 | 12/2011 | Ravenscroft | |
| 8,340,836 B2 | 12/2012 | Taylor | |
| 8,521,339 B2 | 8/2013 | Gariepy et al. | |
| 8,543,265 B2 | 9/2013 | Ekhaguere et al. | |
| 8,600,602 B1 | 12/2013 | Mcandrew et al. | |
| 8,692,703 B1 | 4/2014 | Dove et al. | |
| 8,702,033 B2 | 4/2014 | Regmi | |
| 8,755,950 B2 | 6/2014 | Johansson | |
| 8,788,118 B2 | 7/2014 | Matos | |
| 8,838,289 B2 | 9/2014 | Margolin | |
| 8,868,328 B1 | 10/2014 | Estkowski | |
| 9,078,098 B1 * | 7/2015 | Cronin | H04W 64/00 |
| 9,087,451 B1 | 7/2015 | Jarrell | |
| 9,188,657 B2 | 11/2015 | Benson | |
| 9,201,422 B2 | 12/2015 | Ohtomo et al. | |
| 9,274,529 B2 | 3/2016 | Ben-shachar et al. | |
| 9,317,036 B2 | 4/2016 | Wang et al. | |
| 9,329,001 B2 | 5/2016 | Mohamadi | |
| 9,483,950 B1 | 11/2016 | Wang et al. | |
| 9,651,944 B2 | 5/2017 | Arwine | |
| 9,704,408 B2 | 7/2017 | Yu et al. | |
| 9,734,723 B1 | 8/2017 | Bruno et al. | |
| 9,842,505 B2 | 12/2017 | Wang et al. | |
| 10,147,329 B2 | 12/2018 | Liu et al. | |
| 10,380,900 B2 | 8/2019 | Batla et al. | |
| 10,586,463 B2 | 3/2020 | Xu et al. | |
| 10,733,895 B2 | 8/2020 | Liu et al. | |
| 2002/0022909 A1 | 2/2002 | Karem | |
| 2003/0055540 A1 | 3/2003 | Hansen | |
| 2003/0134645 A1 | 7/2003 | Stern et al. | |
| 2003/0225489 A1 | 12/2003 | Tsao | |
| 2003/0227395 A1 | 12/2003 | Zeineh | |
| 2004/0193334 A1 | 9/2004 | Carlsson et al. | |
| 2004/0217883 A1 | 11/2004 | Judge et al. | |
| 2004/0249519 A1 | 12/2004 | Frink | |
| 2005/0165886 A1 | 7/2005 | Tuer et al. | |
| 2006/0106506 A1 | 5/2006 | Nichols et al. | |
| 2006/0167597 A1 | 7/2006 | Bodin et al. | |
| 2006/0167599 A1 | 7/2006 | Bodin et al. | |
| 2006/0217877 A1 | 9/2006 | Bodin et al. | |
| 2006/0217881 A1 | 9/2006 | Pei et al. | |
| 2007/0018052 A1 | 1/2007 | Eriksson | |
| 2007/0093946 A1 | 4/2007 | Gideoni | |
| 2007/0106473 A1 | 5/2007 | Bodin et al. | |
| 2007/0146167 A1 | 6/2007 | Miller et al. | |
| 2008/0025238 A1 | 1/2008 | Mccown et al. | |
| 2008/0174454 A1 | 7/2008 | Bitar et al. | |
| 2008/0183344 A1 * | 7/2008 | Doyen | G08G 5/0013 |
| | | | 701/9 |
| 2008/0306680 A1 | 12/2008 | Marty et al. | |
| 2009/0012661 A1 | 1/2009 | Louis | |
| 2009/0027253 A1 | 1/2009 | Van Tooren et al. | |
| 2009/0082913 A1 | 3/2009 | Yount et al. | |
| 2009/0210109 A1 | 8/2009 | Ravenscroft | |
| 2009/0322567 A1 | 12/2009 | Stock et al. | |
| 2010/0004798 A1 | 1/2010 | Bodin et al. | |
| 2010/0031334 A1 | 2/2010 | Shaikh | |
| 2010/0084513 A1 | 4/2010 | Gariepy et al. | |
| 2010/0114633 A1 | 5/2010 | Sislak et al. | |
| 2010/0225457 A1 | 9/2010 | Aguirre | |
| 2010/0286859 A1 | 11/2010 | Feigh et al. | |
| 2011/0202206 A1 | 8/2011 | Karthikeyan et al. | |
| 2011/0301842 A1 | 12/2011 | Krupansky et al. | |
| 2012/0143482 A1 | 6/2012 | Goossen et al. | |
| 2012/0150423 A1 | 6/2012 | Khatwa et al. | |
| 2012/0203419 A1 | 8/2012 | Tucker et al. | |
| 2012/0210853 A1 | 8/2012 | Abershitz et al. | |
| 2013/0046422 A1 | 2/2013 | Cabos | |
| 2013/0060405 A1 | 3/2013 | Komatsuzaki et al. | |
| 2013/0085629 A1 | 4/2013 | Washington et al. | |
| 2013/0198857 A1 | 8/2013 | Maier et al. | |
| 2013/0238170 A1 | 9/2013 | Klinger | |
| 2013/0261850 A1 | 10/2013 | Smith et al. | |
| 2013/0269013 A1 | 10/2013 | Parry et al. | |
| 2013/0311009 A1 | 11/2013 | McAndrew et al. | |
| 2013/0317667 A1 | 11/2013 | Kruglick | |
| 2014/0018976 A1 | 1/2014 | Goossen et al. | |
| 2014/0018979 A1 | 1/2014 | Goossen et al. | |
| 2014/0025229 A1 | 1/2014 | Levien et al. | |
| 2014/0067160 A1 | 3/2014 | Levien et al. | |
| 2014/0107882 A1 * | 4/2014 | Tojima | E02F 9/205 |
| | | | 701/23 |
| 2014/0142785 A1 | 5/2014 | Fuentes et al. | |
| 2014/0231590 A1 | 8/2014 | Trowbridge et al. | |
| 2014/0330456 A1 | 11/2014 | Lopez Morales et al. | |
| 2014/0359724 A1 | 12/2014 | Kubisch | |
| 2014/0371952 A1 | 12/2014 | Ohtomo et al. | |
| 2014/0375480 A1 * | 12/2014 | Morgan | H04W 4/021 |
| | | | 340/990 |
| 2014/0379173 A1 | 12/2014 | Knapp et al. | |
| 2015/0024711 A1 | 1/2015 | Stob | |
| 2015/0087303 A1 | 3/2015 | Hillary et al. | |
| 2015/0153175 A1 | 6/2015 | Skaaksrud | |
| 2015/0241878 A1 | 8/2015 | Crombez et al. | |
| 2015/0254988 A1 | 9/2015 | Wang et al. | |
| 2015/0336667 A1 | 11/2015 | Srivastava et al. | |
| 2015/0336668 A1 | 11/2015 | Pasko et al. | |
| 2015/0339931 A1 | 11/2015 | Yu et al. | |
| 2015/0339933 A1 | 11/2015 | Batla et al. | |
| 2015/0379874 A1 | 12/2015 | Ubhi et al. | |
| 2016/0005318 A1 | 1/2016 | Wang et al. | |
| 2016/0071420 A1 | 3/2016 | Heilman | |
| 2016/0080388 A1 * | 3/2016 | Hoesl | H04L 63/08 |
| | | | 726/4 |
| 2016/0140851 A1 | 5/2016 | Levy et al. | |
| 2016/0163203 A1 | 6/2016 | Wang et al. | |

(56) References Cited

U.S. PATENT DOCUMENTS

| | | | |
|---|---|---|---|
| 2016/0185358 A1* | 6/2016 | Todasco | A61B 5/6893 701/48 |
| 2016/0189549 A1* | 6/2016 | Marcus | G08G 5/0091 701/3 |
| 2016/0214715 A1 | 7/2016 | Meffert | |
| 2016/0225264 A1 | 8/2016 | Taveira | |
| 2016/0240087 A1 | 8/2016 | Kube et al. | |
| 2016/0244161 A1 | 8/2016 | Mcclure | |
| 2016/0253907 A1 | 9/2016 | Taveira | |
| 2016/0275801 A1 | 9/2016 | Kopardekar | |
| 2016/0321930 A9 | 11/2016 | Yu et al. | |
| 2017/0243494 A1 | 8/2017 | Taveira | |
| 2017/0301242 A1 | 10/2017 | Yu et al. | |
| 2020/0202721 A1 | 6/2020 | Xu et al. | |
| 2020/0357286 A1 | 11/2020 | Liu et al. | |
| 2022/0068143 A1 | 3/2022 | Xu et al. | |
| 2022/0068144 A1 | 3/2022 | Liu et al. | |

FOREIGN PATENT DOCUMENTS

| | | |
|---|---|---|
| CN | 1222971 A | 7/1999 |
| CN | 1289994 C | 12/2006 |
| CN | 101504287 A | 8/2009 |
| CN | 101582202 A | 11/2009 |
| CN | 101598557 A | 12/2009 |
| CN | 101796524 A | 8/2010 |
| CN | 101826262 A | 9/2010 |
| CN | 101833870 A | 9/2010 |
| CN | 102331260 A | 1/2012 |
| CN | 102496312 A | 6/2012 |
| CN | 102510011 A | 6/2012 |
| CN | 202267872 U | 6/2012 |
| CN | 102591352 A | 7/2012 |
| CN | 102620736 A | 8/2012 |
| CN | 102637040 A | 8/2012 |
| CN | 102955478 A | 3/2013 |
| CN | 103116360 A | 5/2013 |
| CN | 103177609 A | 6/2013 |
| CN | 103226356 A | 7/2013 |
| CN | 103267528 A | 8/2013 |
| CN | 103365299 A | 10/2013 |
| CN | 103455036 A | 12/2013 |
| CN | 103592947 A | 2/2014 |
| CN | 103680215 A | 3/2014 |
| CN | 103699132 A | 4/2014 |
| CN | 104216414 A | 12/2014 |
| CN | 104834307 A | 8/2015 |
| CN | 104991564 A | 10/2015 |
| CN | 105139693 A | 12/2015 |
| CN | 106461396 A | 2/2017 |
| CN | 107407938 A | 11/2017 |
| CN | 108351645 A | 7/2018 |
| EP | 0490745 B1 | 3/1996 |
| EP | 1218698 B1 | 1/2008 |
| EP | 2648175 A2 | 10/2013 |
| EP | 2674723 A2 | 12/2013 |
| FR | 2893146 A1 | 5/2007 |
| GB | 2476149 A | 6/2011 |
| JP | H09507714 A | 8/1997 |
| JP | H11296800 A | 10/1999 |
| JP | 2003127994 A | 5/2003 |
| JP | 2003127997 A | 5/2003 |
| JP | 2004291805 A | 10/2004 |
| JP | 2005071176 A | 3/2005 |
| JP | 2005274284 A | 10/2005 |
| JP | 2006143193 A | 6/2006 |
| JP | 2007164280 A | 6/2007 |
| JP | 2007237873 A | 9/2007 |
| JP | 2008247293 A | 10/2008 |
| JP | 2009300361 A | 12/2009 |
| JP | 2010095246 A | 4/2010 |
| JP | 2014040231 A | 3/2014 |
| JP | 2016539838 A | 12/2016 |
| KR | 20160074895 A | 6/2016 |
| RU | 2657916 C1 | 6/2018 |
| WO | 2007054448 A1 | 5/2007 |
| WO | 2009091431 A1 | 7/2009 |
| WO | 2010085944 A1 | 8/2010 |
| WO | 2011155020 A1 | 12/2011 |
| WO | 2011159182 A1 | 12/2011 |
| WO | 2015157883 A1 | 10/2015 |
| WO | 2017021955 A1 | 2/2017 |

OTHER PUBLICATIONS

CNIPA, Office Action, CN Patent Application 202110393178.7, dated Jun. 24, 2022, 8 pages.

Communication to USPTO for U.S. Appl. No. 14/262,563 dated Oct. 29, 2015, 28 pages.

EPO, Extended European Search Report, EP 15785769.9, dated Jan. 17, 2017, 8 pages.

EPO, European Search Report, EP 15874400, dated Jun. 30, 2017, 9 pages.

European Patent Office, Communication pursuant to Article 94(3) EPC, EP Patent Application 19198007.7, dated Mar. 14, 2022, 13 pages.

European Patent Office, Summons to Oral Proceedings, EP Patent Application No. 15874400.3, mailed Apr. 13, 2022, 17 pages.

Exhibit A. Invitation Relating to Certain Parts of the International Application that are, or Appear to be, Missing, indicating that the original filing was missing Figures 9-11. Dated Mar. 20, 2014 for PCT/CN2014/073143, 3 pages.

Exhibit B. Letter—Replacement sheet with missing figures on Apr. 17, 2014, 7 pages.

Exhibit C. Notification Concerning Later Submitted Parts of an International Application. Dated May 28, 2014 for PCT/CN2014/073143, 2 pages.

Flite Test—Blade 350QX Quadcopter—Review. Published Mar. 17, 2014, 3 pages. <www.youtube.com/watch?v=F9YTVrxKRdU>.

Newman. Here's How to Set Up a No-Fly Drone Zone Over Your House. Feb. 10, 2015, 5 pages. <www.slate.com/blogs/future_tense/2015/02/10/noflyzone_org_lets_you_geofence_the_area_over_your_house_for_drones_to_avoid.html,>.

NoFlyZone web site. Accessed Nov. 11, 2015, 3 pages. <www.noflyzone.org>.

Response to Feb. 7, 2022 Non-Final Office Action in U.S. Appl. No. 16/942,096 filed with the U.S. Patent Office on Jun. 1, 2022, 13 pages.

Response to Feb. 7, 2022 Restriction Requirement in U.S. Appl. No. 17/523,847 filed with the U.S. Patent Office on Mar. 11, 2022, 10 pages.

Response to Final Office Action in U.S. Appl. No. 16/942,096 filed with the U.S. Patent Office on Aug. 25, 2022, 11 pages.

Response to Jan. 31, 2022 Non-Final Office Action in U.S. Appl. No. 17/523,859 filed with the U.S. Patent Office on Apr. 13, 2022, 20 pages.

Response to Mar. 29, 2022 Non-Final Office Action in U.S. Appl. No. 17/523,847 filed with the U.S. Patent Office on Apr. 1, 2022, 11 pages.

Response to Nov. 2, 2021 Non-Final Office Action in U.S. Appl. No. 16/810,631 filed with the U.S. Patent Office on Feb. 7, 2022, 13 pages.

Robot create owners guide. 2006. 20 pages. <www.irobot.com>.

Sudekum. Don't fly drones here. MapBox. Jul. 22, 2014, 4 pages. <www.mapbox.com/blog/dont-fly-here/>.

U.S. Appl. No. 15/369,383, filed Dec. 5, 2016, 122 pages.

United State Patent Office, Notice of Allowance for U.S. Appl. No. 14/815,800, dated Feb. 21, 2017, 2 pages.

United States Patent and Trademark Office, Final Office Action, U.S. Appl. No. 16/942,096, dated Jun. 24, 2022, 7 pages.

United States Patent and Trademark Office, Non-Final Office Action, U.S. Appl. No. 16/810,631, dated Nov. 2, 2021, 9 pages.

United States Patent and Trademark Office, Non-Final Office Action, U.S. Appl. No. 16/942,096, dated Feb. 7, 2022, 9 pages.

United States Patent and Trademark Office, Non-Final Office Action, U.S. Appl. No. 17/523,847, dated Mar. 29, 2022, 11 pages.

(56) References Cited

OTHER PUBLICATIONS

United States Patent and Trademark Office, Non-Final Office Action, U.S. Appl. No. 17/523,859, dated Jan. 31, 2022, 10 pages.
United States Patent and Trademark Office, Notice of Allowance, U.S. Appl. No. 16/810,631, dated Jun. 15, 2022, 5 pages.
United States Patent and Trademark Office, Notice of Allowance, U.S. Appl. No. 16/810,631, dated Mar. 9, 2022, 9 pages.
United States Patent and Trademark Office, Notice of Allowance, U.S. Appl. No. 16/942,096, dated Sep. 8, 2022, 5 pages.
United States Patent and Trademark Office, Notice of Allowance, U.S. Appl. No. 17/523,847, dated Jun. 1, 2022, 9 pages.
United States Patent and Trademark Office, Notice of Allowance, U.S. Appl. No. 17/523,859, dated Apr. 22, 2022, 6 pages.
United States Patent and Trademark Office, Notice of Allowance, U.S. Appl. No. 17/523,859, dated Jul. 11, 2022, 6 pages.
United States Patent and Trademark Office, Restriction Requirement, U.S. Appl. No. 17/523,847, dated Feb. 7, 2022, 6 pages.
United States Patent Office, Communication for U.S. Appl. No. 14/262,563, dated Oct. 29, 2015, 2 pages.
United States Patent Office, Notice of Allowance for U.S. Appl. No. 14/262,563, dated Aug. 17, 2015, 4 pages.
United States Patent Office, Notice of Allowance for U.S. Appl. No. 14/262,563, dated Feb. 3, 2016, 8 pages.
United States Patent Office, Notice of Allowance for U.S. Appl. No. 14/262,563, dated Jun. 11, 2015, 9 pages.
United States Patent Office, Notice of Allowance for U.S. Appl. No. 14/262,563, dated Nov. 18, 2015, 8 pages.
United States Patent Office, Notice of Allowance for U.S. Appl. No. 14/815,800, dated Mar. 21, 2016, 9 pages.
United States Patent Office, Notice of Allowance for U.S. Appl. No. 14/815,800, dated Sep. 29, 2016, 9 pages.
United States Patent Office, Notice of Allowance for U.S. Appl. No. 14/857,120, dated Aug. 3, 2016, 8 pages.
United States Patent Office, Notice of Allowance for U.S. Appl. No. 14/857,120, dated Mar. 29, 2016, 8 pages.
United States Patent Office, Notice of Allowance for U.S. Appl. No. 15/011,041, dated May 9, 2017, 9 pages.
United States Patent Office, Office Action for U.S. Appl. No. 14/262,563, dated Feb. 11, 2015, 14 pages.
United States Patent Office, Office Action for U.S. Appl. No. 14/857,120, dated Nov. 20, 2015, 16 pages.
United States Patent Office, Office Action for U.S. Appl. No. 15/011,041, dated Jan. 20, 2017, 10 pages.
WIPO International Preliminary Report on Patentability, PCT/CN2015/073915, dated Aug. 24, 2016, 182 pages.
WIPO International Search Report and Written Opinion, PCT/CN2014/073143, dated Dec. 10, 2014, 15 pages.
WIPO International Search Report and Written Opinion, PCT/CN2015/073915, dated Apr. 17, 2015, 7 pages.
WIPO International Search Report and Written Opinion, PCT/CN2015/098149, dated Mar. 30, 2016, 11 pages.
WIPO International Search Report and Written Opinion, PCT/US2015/011041, dated May 1, 2015, 9 pages.
WIPO, International Search Report and Written Opinion, PCT/CN2015/075627, dated Jan. 12, 2016, 6 pages.

* cited by examiner

OPEN PLATFORM FOR FLIGHT RESTRICTED REGION

CROSS-REFERENCE

This application is a continuation of U.S. application Ser. No. 17/523,859, filed Nov. 10, 2021, which is a continuation of U.S. application Ser. No. 16/942,096, filed on Jul. 29, 2020, which is a continuation of U.S. patent application Ser. No. 16/198,382, filed on Nov. 21, 2018, now U.S. Pat. No. 10,733,895, which is a continuation of U.S. patent application Ser. No. 15/360,371, filed on Nov. 23, 2016, now U.S. Pat. No. 10,147,329, which is a continuation of International Application No. PCT/CN2015/075627, filed on Mar. 31, 2015, the entire contents of all of which are incorporated herein by reference.

BACKGROUND OF THE DISCLOSURE

Aerial vehicles such as unmanned aerial vehicles (UAVs) can be used for performing surveillance, reconnaissance, and exploration tasks for military and civilian applications. Such vehicles may carry a payload configured to perform a specific function.

The air traffic control of every country (for example in the US, this is the FAA) has various regulations for airspace near airports or other regions. In addition, even if not explicitly regulated, various public and private parties may desire restrictions on the operation of such aerial vehicles with respect to certain regions.

SUMMARY OF THE DISCLOSURE

In some instances, it may be desirable to provide a platform for managing flight restriction regions for aerial vehicles. Such platforms may provide centralized management for inputting, managing, and accessing flight restriction regions. For example, the platforms may provide an interface for various users to input flight restriction regions, may aggregate the inputs and approve or deny proposed flight restriction regions, may record or store the flight restriction regions, may display the flight restriction regions, may be downloaded and utilized by UAV operators (e.g., approve or deny a proposed flight path based on the flight restriction regions), or may be utilized in granting access to flight restriction regions (e.g., by temporarily lifting the restriction).

Thus, in one aspect, a method of collecting information regarding a plurality of flight restriction regions is provided. The method comprises: receiving, from a plurality of users via corresponding user input devices, input designating parameters of flight restriction regions, wherein the parameters include a location of the flight restriction regions; and determining, with aid of one or more processors, a three-dimensional space for each of the flight restriction regions, wherein the three-dimensional space depends on the parameters of the flight restriction regions.

In some embodiments, the parameters of flight restriction regions include radii of the flight restriction regions. In some embodiments, the three-dimensional space for flight restriction regions defines a cylinder shape. In some embodiments, the three-dimensional space for flight restriction regions defines a sphere or semi-sphere. In some embodiments, the parameters of flight restriction regions include altitude limits of flight restriction regions. In some embodiments, altitude limits are altitude ceilings. In some embodiments, altitude limits are altitude floors. In some embodiments, the method further comprises showing, on a display, a map with a representation of the locations and the three-dimensional space of the flight restriction regions. In some embodiments, the location of flight restriction regions includes global coordinates of the locations. In some embodiments, the location of flight restriction regions includes a street address of the locations. In some embodiments, the locations of flight restriction regions includes a portion of a map selected via finger touch or pointer selection. In some embodiments, parameters of flight restriction regions designate a shape of the three-dimensional space of flight restriction regions. In some embodiments, the method further comprises receiving an input designating a category of the flight restriction regions from a plurality of categories. In some embodiments, the plurality of categories comprise two or more of the following: airports, military bases, borders, public sensitive areas, and private restricted regions. In some embodiments, each of the plurality of categories are associated with a different corresponding flight response measure. In some embodiments, each of the plurality of categories are associated with a different corresponding three-dimensional space. In some embodiments, the flight restriction regions are associated with flight response measures. In some embodiments, the method further comprises approving the input designating the locations of the flight restrictions regions. In some embodiments, approving the input comprises verifying an identity of the user. In some embodiments, the flight restriction regions are associated with mandatory flight response measures. In some embodiments, the flight restriction regions are associated with voluntary flight response measures when the input designating the location of the flight restriction regions are unapproved. In some embodiments, the method further comprises receiving an input comprising an identity of the user. In some embodiments, the method further comprises verifying the identity of the user. In some embodiments, the three-dimensional space is generated based on the corresponding locations of the flight restriction region. In some embodiments, the locations of flight restriction regions are locations of properties and wherein the three-dimensional boundaries depend on corresponding property boundary lines. In some embodiments, the method further comprises generating a flight route based on the three-dimensional space for the flight restriction regions. In some embodiments, the method further comprises storing, in one or more memory units, the locations and the three-dimensional boundaries of the flight restriction regions. In some embodiments, the flight restriction regions exist for a period of time, wherein the period of time is of a predetermined length. In some embodiments, the flight restriction regions are associated with flight response measures. In some embodiments, the flight restriction regions are not associated with flight response measures outside of the period of time. In some embodiments, the flight restriction regions are associated with a different set of flight response measures during the period of time. In some embodiments, the method further comprises showing, on a display, a map with a representation of the locations and the three-dimensional space of the flight restriction regions. In some embodiments, the representation of the locations and the three-dimensional space of the flight restriction regions are no longer shown outside of the period of time. In some embodiments, the predetermined length is from a specified starting time to a specified ending time. In some embodiments, the flight restriction regions exists during a period of time, wherein a length of the period of time is determined based on one or more set conditions. In some embodiments, the flight restriction regions are associated with flight response measures. In some embodiments, the flight restriction regions are not associated with flight response measures outside of the period of time. In some embodiments, the flight restriction regions are associated with a different set of flight response measures during the period of time. In some embodiments, the method further comprises showing, on a display, a map with a representation of the locations and the three-dimensional space of the flight restriction regions. In some embodiments, the representation of the locations and the three-dimensional space of the flight restriction regions are no longer shown outside of the period of time. In some embodiments, the parameters of flight restriction regions include a flight response measure of the flight restriction region. In some embodiments, the parameters include a flight response measure associated with the flight restriction region.

In another aspect, a system for collecting information regarding a plurality of flight restriction regions is provided. The system comprises: one or more processors individually or collectively configured to: receive, from a plurality of users via corresponding user input devices, input designating parameters of flight restriction regions, wherein the parameters include a location of the flight restriction regions; and determine a three-dimensional space for each of the flight restriction regions, wherein the three-dimensional space depends on the parameters of the flight restriction regions.

In some embodiments, the parameters of flight restriction regions include radii of the flight restriction regions. In some embodiments, the three-dimensional space for flight restriction regions defines a cylinder shape. In some embodiments, the three-dimensional space for flight restriction regions defines a sphere or semi-sphere. In some embodiments, the parameters of flight restriction regions include altitude limits of flight restriction regions. In some embodiments, altitude limit are altitude ceilings. In some embodiments, altitude limits are altitude floors. In some embodiments, the system further comprises a display, wherein the display shows a map with a representation of the location and the three-dimensional space of the flight restriction regions. In some embodiments, the location of flight restriction regions includes global coordinates of the locations. In some embodiments, the location of flight restriction regions includes a street address of the locations. In some embodiments, the locations of flight restriction regions includes a portion of a map selected via finger touch or pointer selection. In some embodiments, parameters of flight restriction regions designate a shape of the three-dimensional space of flight restriction regions. In some embodiments, the one or more processors are further configured to receive an input designating a category of the flight restriction regions from a plurality of categories. In some embodiments, the plurality of categories comprise two or more of the following: airports, military bases, borders, public sensitive areas, and private restricted regions. In some embodiments, each of the plurality of categories are associated with a different corresponding flight response measure. In some embodiments, each of the plurality of categories are associated with a different corresponding three-dimensional space. In some embodiments, the flight restriction regions are associated with flight response measures. In some embodiments, the one or more processors are further configured to approve the input designating the locations of the flight restrictions regions. In some embodiments, the input is approved when an identity of the user is verified. In some embodiments, the flight restriction regions are associated with mandatory flight response measures. In some embodiments, the flight restriction regions are associated with voluntary flight response measures when the input designating the location of the flight restriction regions are unapproved. In some embodiments, the one or more processors are configured to receive an input comprising an identity of the user. In some embodiments, the one or more processors are configured to verify the identity of the user. In some embodiments, the three-dimensional space is generated based on the corresponding locations of the flight restriction region. In some embodiments, the locations of flight restriction regions are locations of properties and wherein the three-dimensional boundaries depend on corresponding property boundary lines. In some embodiments, the one or more processors are configured to generate a flight route based on the three-dimensional space for the flight restriction regions. In some embodiments, the system further comprises one or more memory units, individually or collectively configured to store the locations and the three-dimensional boundaries of the flight restriction regions. In some embodiments, the flight restriction regions exist for a period of time, wherein the period of time is of a predetermined length. In some embodiments, the flight restriction regions are associated with flight response measures. In some embodiments, the flight restriction regions are not associated with flight response measures outside of the period of time. In some embodiments, the flight restriction regions are associated with a different set of flight response measures during the period of time. In some embodiments, the system further comprises a display, wherein the display is configured to show a map with a representation of the locations and the three-dimensional space of the flight restriction regions. In some embodiments, the representation of the locations and the three-dimensional space of the flight restriction regions are no longer shown outside of the period of time. In some embodiments, the predetermined length is from a specified starting time to a specified ending time. In some embodiments, the flight restriction regions exists during a period of time, wherein a length of the period of time is determined based on one or more set conditions. In some embodiments, the flight restriction regions are associated with flight response measures. In some embodiments, the flight restriction regions are not associated with flight response measures outside of the period of time. In some embodiments, the flight restriction regions are associated with a different set of flight response measures during the period of time. In some embodiments, the system further comprises a display, wherein the display is configured to show a map with a representation of the locations and the three-dimensional space of the flight restriction regions. In some embodiments, the representation of the locations and the three-dimensional space of the flight restriction regions are no longer shown outside of the period of time. In some embodiments, the parameters of flight restriction regions include a flight response measure of the flight restriction region. In some embodiments, the parameters include a flight response measure associated with the flight restriction region.

In another aspect, a non-transitory computer readable medium containing program instructions for collecting information regarding a plurality of flight restriction regions is provided. The computer readable medium comprises: program instructions for receiving, from a plurality of users via corresponding user input devices, input designating parameters of the flight restriction regions, wherein the parameters include a location of the flight restriction regions; and program instructions for determining, with aid of one or more processors, a three-dimensional space for each of the flight restriction regions, wherein the three-dimensional space depend on the parameters of flight restriction regions.

In some embodiments, the parameters of flight restriction regions include radii of the flight restriction regions. In some embodiments, the three-dimensional space for flight restriction regions defines a cylinder shape. In some embodiments, the three-dimensional space for flight restriction regions defines a sphere or semi-sphere. In some embodiments, the parameters of flight restriction regions include altitude limits of flight restriction regions. In some embodiments, altitude limits are altitude ceilings. In some embodiments, altitude limits are altitude floors. In some embodiments, the computer readable medium further comprises program instructions for showing, on a display, a map with a representation of the locations and the three-dimensional space of the flight restriction regions. In some embodiments, the location of flight restriction regions includes global coordinates of the locations. In some embodiments, the location of flight restriction regions includes a street address of the locations. In some embodiments, the locations of flight restriction regions includes a portion of a map selected via finger touch or pointer selection. In some embodiments, parameters of flight restriction regions designate a shape of the three-dimensional space of flight restriction regions. In some embodiments, the computer readable medium further comprises program instructions for receiving an input designating a category of the flight restriction regions from a plurality of categories. In some embodiments, the plurality of categories comprise two or more of the following: airports, military bases, borders, public sensitive areas, and private restricted regions. In some embodiments, each of the plurality of categories are associated with a different corresponding flight response measure. In some embodiments, each of the plurality of categories are associated with a different corresponding three-dimensional space. In some embodiments, the flight restriction regions are associated with flight response measures. In some embodiments, the computer readable medium further comprises program instructions for approving the input designating the locations of the flight restrictions regions. In some embodiments, approving the input comprises verifying an identity of the user. In some embodiments, the flight restriction regions are associated with mandatory flight response measures. In some embodiments, the flight restriction regions are associated with voluntary flight response measures when the input designating the location of the flight restriction regions are unapproved. In some embodiments, the computer readable medium further comprises program instructions for receiving an input comprising an identity of the user. In some embodiments, the computer readable medium further comprises program instructions for verifying the identity of the user. In some embodiments, the three-dimensional space is generated based on the corresponding locations of the flight restriction region. In some embodiments, the locations of flight restriction regions are locations of properties and wherein the three-dimensional boundaries depend on corresponding property boundary lines. In some embodiments, the computer readable medium further comprises program instructions for generating a flight route based on the three-dimensional space for the flight restriction regions. In some embodiments, the computer readable medium further comprises program instructions for storing, in one or more memory units, the locations and the three-dimensional boundaries of the flight restriction regions. In some embodiments, the flight restriction regions exist for a period of time, wherein the period of time is of a predetermined length. In some embodiments, the flight restriction regions are associated with flight response measures. In some embodiments, the flight restriction regions are not associated with flight response measures outside of the period of time. In some embodiments, the flight restriction regions are associated with a different set of flight response measures during the period of time. In some embodiments, the computer readable medium further comprises program instructions for showing, on a display, a map with a representation of the locations and the three-dimensional space of the flight restriction regions. In some embodiments, the representation of the locations and the three-dimensional space of the flight restriction regions are no longer shown outside of the period of time. In some embodiments, the predetermined length is from a specified starting time to a specified ending time. In some embodiments, the flight restriction regions exists during a period of time, wherein a length of the period of time is determined based on one or more set conditions. In some embodiments, the flight restriction regions are associated with flight response measures. In some embodiments, the flight restriction regions are not associated with flight response measures outside of the period of time. In some embodiments, the flight restriction regions are associated with a different set of flight response measures during the period of time. In some embodiments, the computer readable medium further comprises program instructions for showing, on a display, a map with a representation of the locations and the three-dimensional space of the flight restriction regions. In some embodiments, the representation of the locations and the three-dimensional space of the flight restriction regions are no longer shown outside of the period of time. In some embodiments, the parameters of flight restriction regions include a flight response measure of the flight restriction region. In some embodiments, the parameters include a flight response measure associated with the flight restriction region.

In another aspect, a method of designating flight restriction regions is provided. The method comprises: receiving, from a user via a user input device, an input designating one or more parameters of a flight restriction region, wherein the one or more parameters include a location of a flight restriction region; and verifying, with aid of one or more processors, that the user is authorized to designate the location as a flight restriction region.

In some embodiments, the method further comprises determining a three-dimensional space for the flight restriction region if the user is verified as being authorized to designate the location as a flight restriction region, wherein the three-dimensional space depends on the parameters of the flight restriction regions. In some embodiments, the location of the flight restriction region is a global coordinate of the flight restriction region. In some embodiments, the location of the flight restriction region is a street address of the flight restriction region. In some embodiments, the flight restriction region is a private residence. In some embodiments, the user is authorized to designate the private residence as a flight restriction region when the user is an owner of the private residence. In some embodiments, the user is authorized to designate the private residence as a flight restriction region when the user is a resident of the private residence. In some embodiments, the flight restriction region is a commercial region. In some embodiments, the flight restriction region is an airport, a military base, or public sensitive area. In some embodiments, the flight restriction region is a jurisdictional border. In some embodiments, verifying that the user is authorized includes authenticating an identity of the user. In some embodiments, the identity of the user is authenticated using a password, phrase, or code entered by the user. In some embodiments, the identity of the user is authenticated using a biometric input from the user. In some embodiments, the identity of the user is authenticated using a unique object in the possession of the user. In some embodiments, verifying that the user is authorized includes confirming that the user exercises control over the flight restriction region. In some embodiments, the user is determined to exercise control over the flight restriction region when the user is an owner of the flight restriction region. In some embodiments, the user is determined to exercise control over the flight restriction region when the user is a tenant or resident of the flight restriction region. In some embodiments, the user is determined to exercise control over the flight restriction region when the user is conveyed the authority by a governing entity. In some embodiments, verifying that the user is authorized includes receiving an electronic transmission from a third party that indicates that the user is authorized. In some embodiments, the method further comprises storing, in one or more memory units, the location of the flight restriction region, when the user is verified as being authorized to designate the location as a flight restriction region.

In another aspect, a system for designating flight restriction regions is provided. The system comprises: one or more processors individually or collectively configured to: receive, from a user via a user input device, an input designating one or more parameters of a flight restriction region, wherein the one or more parameters include a location of a flight restriction region; and verify that the user is authorized to designate the location as a flight restriction region.

In some embodiments, the one or more processors are further configured to: determine a three-dimensional space for the flight restriction region if the user is verified as being authorized to designate the location as a flight restriction region, wherein the three-dimensional space depends on the parameters of the flight restriction regions. In some embodiments, the location of the flight restriction region is a global coordinate of the flight restriction region. In some embodiments, the location of the flight restriction region is a street address of the flight restriction region. In some embodiments, the flight restriction region is a private residence. In some embodiments, the user is authorized to designate the private residence as a flight restriction region when the user is an owner of the private residence. In some embodiments, the user is authorized to designate the private residence as a flight restriction region when the user is a resident of the private residence. In some embodiments, the flight restriction region is a commercial region. In some embodiments, the flight restriction region is an airport, a military base, or public sensitive area. In some embodiments, the flight restriction region is a jurisdictional border. In some embodiments, the one or more processors are configured to authenticate an identity of the user. In some embodiments, the identity of the user is authenticated using a password, phrase, or code entered by the user. In some embodiments, the identity of the user is authenticated using a biometric input from the user. In some embodiments, the identity of the user is authenticated using a unique object in the possession of the user. In some embodiments, the one or more processors are configured to confirm that the user exercises control over the flight restriction region. In some embodiments, the user is determined to exercise control over the flight restriction region when the user is an owner of the flight restriction region. In some embodiments, the user is determined to exercise control over the flight restriction region when the user is a tenant or resident of the flight restriction region. In some embodiments, the user is determined to exercise control over the flight restriction region when the user is conveyed the authority by a governing entity. In some embodiments, the one or more processors are configured to receive an electronic transmission from a third party that indicates that the user is authorized in order to verify that the location is designated as a flight restriction region. In some embodiments, the system further comprises one or more memory units individually or collectively configured to store the location of the flight restriction region, when the user is verified as being authorized to designate the location as a flight restriction region.

In another aspect, a non-transitory computer readable medium containing program instructions for designating flight restriction regions is provided. The computer readable medium comprises: program instructions for receiving, from a user via a user input device, one or more parameters of a flight restriction region, wherein the one or more parameters include a location of a flight restriction region; and program instructions for verifying, with aid of one or more processors, that the user is authorized to designate the location as a flight restriction region.

In some embodiments, the computer readable medium further comprises program instructions for determining a three-dimensional space for the flight restriction region if the user is verified as being authorized to designate the location as a flight restriction region, wherein the three-dimensional space depends on the parameters of the flight restriction regions. In some embodiments, the location of the flight restriction region is a global coordinate of the flight restriction region. In some embodiments, the location of the flight restriction region is a street address of the flight restriction region. In some embodiments, the flight restriction region is a private residence. In some embodiments, the user is authorized to designate the private residence as a flight restriction region when the user is an owner of the private residence. In some embodiments, the user is authorized to designate the private residence as a flight restriction region when the user is a resident of the private residence. In some embodiments, the flight restriction region is a commercial region. In some embodiments, the flight restriction region is an airport, a military base, or public sensitive area. In some embodiments, the flight restriction region is a jurisdictional border. In some embodiments, program instructions for verifying that the user is authorized includes program instructions for authenticating an identity of the user. In some embodiments, the identity of the user is authenticated using a password, phrase, or code entered by the user. In some embodiments, the identity of the user is authenticated using a biometric input from the user. In some embodiments, the identity of the user is authenticated using a unique object in the possession of the user. In some embodiments, program instructions for verifying that the user is authorized includes program instructions for confirming that the user exercises control over the flight restriction region. In some embodiments, the user is determined to exercise control over the flight restriction region when the user is an owner of the flight restriction region. In some embodiments, the user is determined to exercise control over the flight restriction region when the user is a tenant or resident of the flight restriction region. In some embodiments, the user is determined to exercise control over the flight restriction region when the user is conveyed the authority by a governing entity. In some embodiments, program instructions for verifying that the user is authorized includes program instructions for receiving an electronic transmission from a third party that indicates that the user is authorized. In some embodiments, the computer readable medium further comprises program instructions for storing, in one or more memory units, the location of the flight restriction region, when the user is verified as being authorized to designate the location as a flight restriction region.

In another aspect, a method of collecting information regarding a flight restriction region is provided. The method comprises: receiving, from a user via a user input device, an input designating a location of the flight restriction region; and searching, with aid of one or more processors, one or more external data sources for information associated with the flight restriction region or other flight restriction regions.

In some embodiments, the one or more external data sources include government data sources. In some embodiments, the one or more external data sources include sources that list airport information. In some embodiments, the one or more external data sources are publicly accessible over the Internet. In some embodiments, the one or more external data sources are privately accessible when access is granted. In some embodiments, the location of the flight restriction region is a global coordinate of the flight restriction region. In some embodiments, the location of the flight restriction region is a street address of the flight restriction region. In some embodiments, the flight restriction region is a private residence. In some embodiments, the flight restriction region is a commercial region. In some embodiments, the information about the one or more other flight restriction regions includes locations of the one or more other flight restriction regions. In some embodiments, the one or more other flight restriction regions include an airport, a military base, or public sensitive area. In some embodiments, the one or more other flight restriction regions include a jurisdictional border. In some embodiments, the information associated with the flight restriction region comprises information about an ownership of the flight restriction region. In some embodiments, the information associated with the flight restriction region comprises information about an identity of the user. In some embodiments, the method further comprises storing, in one or more memory units, the location of the flight restriction region and the information associated with the flight restriction region or one or more other flight restriction regions.

In another aspect, a system for collecting information regarding a flight restriction region is provided. The system comprises: one or more processors individually or collectively configured to: receive from a user via a user input device, an input designating a location of the flight restriction region; and search one or more external data sources for information associated with the flight restriction region or other flight restriction regions.

In some embodiments, the one or more external data sources include government data sources. In some embodiments, the one or more external data sources include sources that list airport information. In some embodiments, the one or more external data sources are publicly accessible over the Internet. In some embodiments, the one or more external data sources are privately accessible when access is granted. In some embodiments, the location of the flight restriction region is a global coordinate of the flight restriction region. In some embodiments, the location of the flight restriction region is a street address of the flight restriction region. In some embodiments, the flight restriction region is a private residence. In some embodiments, the flight restriction region is a commercial region. In some embodiments, the information about the one or more other flight restriction regions includes locations of the one or more other flight restriction regions. In some embodiments, the one or more other flight restriction regions include an airport, a military base, or public sensitive area. In some embodiments, the one or more other flight restriction regions include a jurisdictional border. In some embodiments, the information associated with the flight restriction region comprises information about an ownership of the flight restriction region. In some embodiments, the information associated with the flight restriction region comprises information about an identity of the user. In some embodiments, the system further comprises one or more memory units individually or collectively configured to store the location of the flight restriction region and the information associated with the flight restriction region or other flight restriction regions.

In another aspect, a non-transitory computer readable medium containing program instructions for collecting information regarding a flight restriction region is provided. The computer readable medium comprises: program instructions for receiving, from a user via a user input device, an input designating a location of the flight restriction region; and program instructions for searching, with aid of one or more processors, one or more external data sources for information associated with the flight restriction region or other flight restriction regions.

In some embodiments, the one or more external data sources include government data sources. In some embodiments, the one or more external data sources include sources that list airport information. In some embodiments, the one or more external data sources are publicly accessible over the Internet. In some embodiments, the one or more external data sources are privately accessible when access is granted. In some embodiments, the location of the flight restriction region is a global coordinate of the flight restriction region. In some embodiments, the location of the flight restriction region is a street address of the flight restriction region. In some embodiments, the flight restriction region is a private residence. In some embodiments, the flight restriction region is a commercial region. In some embodiments, the information about the one or more other flight restriction regions includes locations of the one or more other flight restriction regions. In some embodiments, the one or more other flight restriction regions include an airport, a military base, or public sensitive area. In some embodiments, the one or more other flight restriction regions include a jurisdictional border. In some embodiments, the information associated with the flight restriction region comprises information about an ownership of the flight restriction region. In some embodiments, the information associated with the flight restriction region comprises information about an identity of the user. In some embodiments, the computer readable medium further comprises program instructions for storing, in one or more memory units, the location of the flight restriction region and the information associated with the flight restriction region or one or more other flight restriction regions.

In another aspect, a method of operating a UAV in a flight restriction region is provided. The method comprises: applying, with aid of a user terminal, for flight in the flight restriction region; receiving, at the user terminal, approval for flight in the flight restriction region; determining, with aid of a one or more processors, an approval region and an approval time; and operating the UAV within the approval region and within the approval time.

In some embodiments, the approval region is defined by a three-dimensional shape. In some embodiments, applying for flight in the flight restriction region includes applying for a permitted flight time. In some embodiments, the permitted flight time is temporary. In some embodiments, the permitted flight time is indefinite. In some embodiments, the approval time is equal to the permitted flight time. In some embodiments, applying for flight in the flight restriction region includes applying for a permitted flight region, wherein the flight region is defined by a three-dimensional shape. In some embodiments, the permitted flight region is equal to the approval region. In some embodiments, the permitted flight region is equal to the flight restriction region. In some embodiments, the permitted flight region is smaller than the flight restriction region. In some embodiments, approval for flight in the flight restriction region is by a third party. In some embodiments, the user terminal is a mobile device. In some embodiments, the mobile device is a cell phone, pda, or tablet. In some embodiments, the mobile device comprises a graphical user interface accessed via an application. In some embodiments, approval for flight in the flight restriction region is by a person that exercises control over the flight restriction region. In some embodiments, the person is determined to exercise control over the flight restriction region when the entity is an owner of the flight restriction region. In some embodiments, the person is determined to exercise control over the flight restriction region when the person is a tenant or resident of the flight restriction region. In some embodiments, the person is determined to exercise control over the flight restriction region when the person is conveyed the authority by a governing entity. In some embodiments, receiving approval comprises receiving a notification of approval. In some embodiments, the flight restriction region is a global coordinate of the flight restriction region. In some embodiments, the flight restriction region is a street address of the flight restriction region. In some embodiments, the flight restriction region is a private residence. In some embodiments, the flight restriction region is a commercial region. In some embodiments, the flight restriction region is an airport, a military base, or public sensitive area. In some embodiments, the flight restriction region is a jurisdictional border.

In another aspect, a system for operating a UAV in a flight restriction region is provided. The system comprises: a user terminal configured to: apply for flight in the flight restriction region; receive approval for flight in the flight restriction region; one or more processors configured to determine an approval region and an approval time; and a UAV configured to operate within the approval region and within the approval time.

In some embodiments, the approval region is defined by a three-dimensional shape. In some embodiments, the user terminal is configured to apply for a permitted flight time. In some embodiments, the permitted flight time is temporary. In some embodiments, the permitted flight time is indefinite. In some embodiments, the approval time is equal to the permitted flight time. In some embodiments, the user terminal is configured to apply for a permitted flight region, wherein the flight region is defined by a three-dimensional shape. In some embodiments, the permitted flight region is equal to the approval region. In some embodiments, the permitted flight region is equal to the flight restriction region. In some embodiments, the permitted flight region is smaller than the flight restriction region. In some embodiments, approval for flight in the flight restriction region is by a third party. In some embodiments, the user terminal is a mobile device. In some embodiments, the mobile device is a cell phone, pda, or tablet. In some embodiments, the mobile device comprises a graphical user interface accessed via an application. In some embodiments, approval for flight in the flight restriction region is by a person that exercises control over the flight restriction region. In some embodiments, the person is determined to exercise control over the flight restriction region when the entity is an owner of the flight restriction region. In some embodiments, the person is determined to exercise control over the flight restriction region when the person is a tenant or resident of the flight restriction region. In some embodiments, the person is determined to exercise control over the flight restriction region when the person is conveyed the authority by a governing entity. In some embodiments, the user terminal is configured to receive a notification of approval. In some embodiments, the flight restriction region is a global coordinate of the flight restriction region. In some embodiments, the flight restriction region is a street address of the flight restriction region. In some embodiments, the flight restriction region is a private residence. In some embodiments, the flight restriction region is a commercial region. In some embodiments, the flight restriction region is an airport, a military base, or public sensitive area. In some embodiments, the flight restriction region is a jurisdictional border.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

The systems, methods, and program instructions of the present disclosure provide a platform for collecting, storing, designating, updating, displaying flight restriction regions, and the further use of such platforms in operating aerial vehicles. The platform may be an open platform that may be accessible to the public. The aerial vehicle may be an unmanned aerial vehicle (UAV), or any other type of movable object. It may be desirable to limit the operation of UAVs in certain regions. For example, some jurisdictions may have one or more no-fly zones in which UAVs are not permitted to fly. In the U.S., UAVs may not fly within certain proximities of airports. Moreover, it may be desirable to limit flight within regions where flight is not explicitly prohibited by the government or other official entity. For example, it may be desirable to limit flight on public or private property where the property owner expresses a desire not to have UAVs fly over their property. For example, it may be desirable to limit flight within regions where flight conditions are known to be hazardous (e.g., known for strong winds, near borders, too far out from the shoreline, near important governmental buildings, etc). For example, it may be desirable to limit flight within regions where a special (e.g., non-regular) event is taking place.

In some instances, it may be desirable to update the flight restriction regions. For example, a previously designated flight restriction region may no longer be necessary (e.g., new owner of property). For example, a special event may be taking place within the flight restriction region and it may be desirable for UAVs to operate within the designated flight restriction region.

Therefore, a need exists to provide users with a centralized tool, or platform to manage the various flight restriction regions. The platform may comprise one or more databases that can be constantly updated by various users that input and update flight restricted regions and/or parameters associated with the flight restriction regions. The databases may also pull information from other sources such as government data sources, regulatory databases, sources that list airport information, public records, sources that are publicly accessible over the internet, or sources that are privately accessible when access is granted and may be updated as the other sources are updated accordingly. The platform may be utilized in providing UAVs a unified interface (e.g., a one-stop shop) in managing or inquiring about flight restricted regions and in employing appropriate flight response measures.

Figure 1:
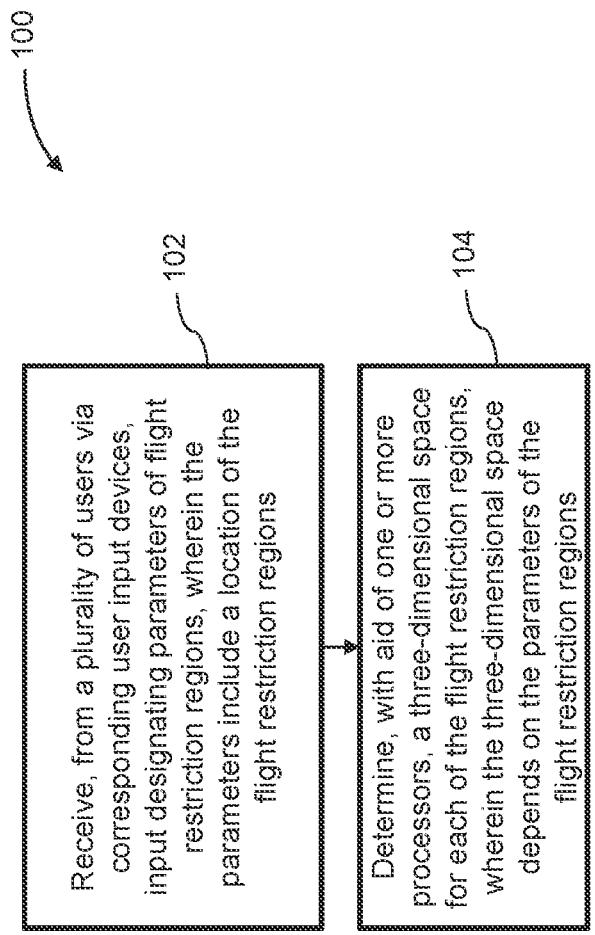
FIG. 1 provides a method of collecting information regarding a plurality of flight restriction regions, in accordance with embodiments.

FIG. 1 provides a method 100 of collecting information regarding a plurality of flight restriction regions, in accordance with embodiments. Similarly, a non-transitory computer readable medium containing program instructions for executing method 100 may be provided as well. A flight restriction region (herein also referred to as a flight-restricted region) may have any location. In some instances, a flight-restricted region location may be a point, or the center or location of the flight-restricted region may be designated by a point (e.g., latitude and longitude coordinates, optionally altitude coordinate). For example, a flight-restricted region location may be a point at the center of an airport, or representative of the airport or other type of flight-restricted region. In other examples, a flight-restricted region may be a two-dimensional area. For example, a flight-restricted region location may include an area or region. The area or region may coincide with, mirror, or trace existing boundaries. The existing boundaries may, for example, be property boundary lines, national borders, boundary between states, natural boundaries (e.g., boundary between a body of water and land), and the like. The area or region may have any shape (e.g., rounded shape, rectangular shape, triangular shape, shape corresponding to one or more natural or man-made feature at the location, shape corresponding to one or more zoning rules, or any other boundaries). For example, the flight-restricted region may trace the boundaries of an airport, the border between nations, other jurisdictional borders, or any other type of boundaries.

The flight restricted regions may be defined by straight or curved lines. In some instances, the flight-restricted region may include a space. The space may be a three-dimensional space that includes latitude, longitude, and/or altitude coordinates. The three-dimensional space may include length, width, and/or height. The flight restricted region may have an altitude limit, such as an altitude floor and/or an altitude ceiling. The altitude limit for the flight restriction region may be constant over the flight restriction region. The altitude limit for the flight restriction region may change over the flight restriction region. For example, the altitude floor may increase as the distance from the center of the flight restriction region increases. The flight-restricted region may include space from the ground up to any altitude above the ground (e.g., predetermined altitude past which a UAV can fly or an altitude beyond which a UAV can fly). This may include altitude straight up from one or more flight-restricted region on the ground. For example, for some latitudes and longitudes, all altitudes may be flight restricted. In some instances, some altitudes for particular lateral regions may be flight-restricted, while others are not. For example, for some latitudes and longitudes, some altitudes may be flight restricted while others are not. Thus, the flight-restricted region may have any number of dimensions, and measurement of dimensions, and/or may be designated by these dimension locations, or by a space, area, line, or point representative of the region.

As mentioned herein, a flight restriction region may include any locations in which it may be desirable to limit operation of a UAV. For example, flight restriction regions may include one or more locations where unauthorized aerial vehicles may not fly. Other examples of types of flight restriction regions are provided further elsewhere herein. This may include unauthorized unmanned aerial vehicles (UAVs) or all UAVs. Flight-restricted regions may include prohibited airspace, which may refer to an area (or volume)

of airspace within which flight of aircraft is not allowed, usually due to security concerns. Prohibited areas may contain airspace of defined dimensions identified by an area on the surface of the earth within which the flight of aircraft is prohibited. Such areas can be established for security or other reasons associated with the national welfare. These areas may be published in the Federal Register and are depicted on aeronautical charts in the United States, or in other publications in various jurisdictions. The flight-restricted region may include one or more of special use airspace (e.g., where limitations may be imposed on aircraft not participating in designated operations), such as restricted airspace (i.e., where entry is typically forbidden at all times from all aircraft and is not subject to clearance from the airspace's controlling body), military operations areas, warning areas, alert areas, temporary flight restriction (TFR) areas, national security areas, and controlled firing areas. The flight-restricted regions as used herein may also include any other airspace designated by a user and may be associated with a flight response measures. For example, a private property such as a residential or commercial building (or public property such as parks) may be designated as a flight restricted region.

Examples of flight-restricted regions may include, but are not limited to, airports, flight corridors, military or other government facilities, locations near sensitive personnel (e.g., when the President or other leader is visiting a location), nuclear sites, research facilities, private airspace, de-militarized zones, certain jurisdictions (e.g., townships, cities, counties, states/provinces, countries, bodies of water or other natural landmarks), national borders (e.g., the border between the U.S. and Mexico), private or public property, or any other types of zones. A flight-restricted region may be a permanent no-fly zone or may be a temporary area where flight is prohibited. A flight-restricted region may be an area where flight is allowed but is associated with a set of flight response measures. A list of flight-restricted regions may be updated. Flight-restricted regions may vary from jurisdiction to jurisdiction. For instance, some countries may include schools as flight-restricted regions while others may not.

In step 102, input designating one or more parameters of flight restriction regions may be received from a plurality of users via corresponding user input devices. Users as described herein may refer to any individual or entity acting on behalf of themselves or on behalf of others. For example, a user may be a home owner inputting one or more parameters of flight restriction regions having to do with his or her property (e.g., home). For example, a user may be an employee at an airport inputting one or more parameters of flight restriction regions having to do with the airport. For example, a user may be a government agency such as the Federal Aviation Administration (FAA), Federal Trade Commission (FTC), Federal Communications Commission (FCC), National Telecommunications and Information Administration (NTIA), Department of Transportation (DoT), or Department of Defense (DoD).

The user input device may be any device that is capable of receiving an input from the user and communicating with a platform for managing the flight restricted regions (referred to herein as the platform). For example, the input device may be a UAV controller, a computer, a mobile device (e.g., cell phone, smartphone, PDA, tablet, etc), and the like. The input device may communicate with the platform via wired or wireless communication. For example, the input device may access a website or an application coupled with the platform. The website or application may comprise a user interface (e.g., graphical user interface) in which to input the parameters. The user interface may additionally present a map (e.g. global map) and display currently existing flight restriction regions on the map. Thus a user may view flight restriction regions input by other users. The currently existing flight restriction regions may be accessed from a database. The platform for managing flight restriction regions may comprise the database. The database may be hosted on a website or an online server. The database may be coupled to one or more memory units. The database may constantly be updated with user inputs or information regarding flight restriction regions acquired via other means.

The parameters of flight restriction regions may include any information that is related to the flight restriction region. The parameters of flight restriction regions may include information that may be extracted to, or stored in the database. For example, the parameters may include a user identifier (e.g., desired username of the user, real name, etc), location, type (e.g., category), status (e.g., update date, upload date, etc), radius or boundaries, height, length, width, circumference, diameter, altitude limit (e.g., altitude ceiling and/or altitude floor), duration, time period of flight restriction regions, or flight response measure associated with flight restriction regions. Additionally, the parameters may include a visual representation of the two-dimensional boundaries of the flight restriction region or a three-dimensional space of flight restriction regions configured by the user on the user interface (e.g., by drawing, tracing, or selecting from a pre-determined list on the user interface). For example, the user may trace a boundary of a flight restriction region (e.g., property boundary line, airport boundary, national boundary), and select an altitude limit (e.g., altitude floor and/or altitude ceiling) of the flight restriction region. For example, the user may trace the three-dimensional boundaries of a flight restriction region on the user interface. In some embodiments, the user may select from a predetermined list of shapes (e.g., three-dimensional shapes such as spheres, semi-spheres, cylinders, cones, inverted cones, rectangular prisms, cubes, etc) that the user desires the flight restriction region to have and place it at a desired location on the graphical user interface (e.g., on a map).

The parameters of flight restriction regions may designate a shape of the two- or three-dimensional space of flight restriction regions. The parameters designating a shape may be a radius, height (e.g., altitude limit), length, width, circumference, diameter, boundary, shape (e.g., configured via tracing, drawing, etc), and the like. For example, if the user input parameter included a radius and location of the flight restriction region, the two-dimensional space may be defined by a circle centered at the location. For example, if the user input parameter included a radius and location of the flight restriction region, the three-dimensional space may be defined by a sphere centered at the location. For example, if the user input parameters included a radius, altitude limit (e.g., ceiling, floor), and location of the flight restriction region, the three-dimensional space may be defined by a cylinder with a base centered at the location and extending from the altitude floor to the altitude ceiling. Other exemplary shapes of the three-dimensional may include, but not be limited to, semi-sphere, cube, rectangular prism, irregular shapes, and the like. For example, if the user input parameters included a visual representation of the two-dimensional boundaries or three-dimensional space of flight restriction regions, the three-dimensional space of the flight restriction region may be defined by the configuration drawn or selected by the user on the user interface.

The parameters of flight restriction regions may include a location of the flight restriction region. The location may include a local or global coordinate (e.g., latitude and/or longitude), nation, city, street address, street intersection, name (e.g., identifiable name associated with the region such as JFK Airport, The White House, Dolores Park, The Golden Gate Bridge), etc of the flight restriction region. For example, a user may be required to input the latitude and longitude of a desired flight restriction region. In some instances, a user may be required to select a location of a desired flight restriction region on a map display. The selection may be made via any user interaction with the display, such as a user touch (e.g., finger pointer selection) of the map display. The user interaction may be via a user interactive device such as a mouse, trackball, touchpad, joystick, camera, microphone, motion sensor, inertial sensor, and the like. The selection may be made with aid of a pointer (e.g., finger pointer, mouse pointer). The location selected on the map by the user may correspond to a local or global coordinate, street address, landmark, or name. The map display may further visually provide a representation of nearby existing flight restriction regions and any information associated with the flight restriction regions (e.g., street address, altitude limit, flight response measure, etc).

The parameter of flight restriction regions may include a flight response measure desired of a flight restriction region. In some instances, flight response measures may be manually input by a user. Alternatively, the flight response measures may be selected automatically with aid of one or more processors, without requiring user input. In some instances, some user input may be provided, but one or more processors may make the final determination of the flight response measures in compliance with the user input. A set of flight response measures may be generated for a flight restriction region. Generation of the set of flight response measures may include creating the flight response measures from scratch. Generation of the set of flight response measures may include selecting a set of flight response measures from a plurality of available sets of flight response measures. Operation of a UAV may be governed or affected by flight response measures. A set of flight response measures may include one or more flight response measures. In some embodiments, a flight response measure may include preventing a UAV from entering the flight restriction region altogether. A UAV that ended up in the flight restriction region may be forced to land or forced to fly away from the flight restriction region. In some embodiments, a flight response measure may include allowing the UAV to remain in the flight restriction region, but imposing certain restrictions on the operation of the UAV within the flight restriction region. The UAV may be forced to remain within the flight restriction region. Various types and examples of flight response measures are described herein.

Flight response measures may govern physical disposition of the UAV. For instance, the flight response measures may govern flight of the UAV, take-off of the UAV, and/or landing of the UAV. In some examples, the flight response measures may prevent the UAV from flying within a flight restriction region. In some examples, the flight response measures may permit only a certain range of orientations of the UAV, or may not permit certain range of orientations of the UAV. The range of orientations of the UAV may be with respect to one, two, or three axes. The axes may be orthogonal axes, such as yaw, pitch, or roll axes. The physical disposition of the UAV may be governed with respect to a flight restriction region.

The flight response measures may govern movement of the UAV. For instance, the flight response measures may govern translational speed of the UAV, translational acceleration of the UAV, angular speed of the UAV (e.g., about one, two, or three axes), or angular acceleration of the UAV (e.g., about one, two, or three axes). The flight response measures may set a maximum limit for the UAV translational speed, UAV translational acceleration, UAV angular speed, or UAV angular acceleration. Thus, the set of flight response measures may comprise limiting flight speed and/or flight acceleration of the UAV. The flight response measures may set a minimum threshold for UAV translational speed, UAV translational acceleration, UAV angular speed, or UAV angular acceleration. The flight response measures may require that the UAV move between the minimum threshold and the maximum limit. Alternatively, the flight response measures may prevent the UAV from moving within one or more translational speed ranges, translational acceleration ranges, angular speed ranges, or angular acceleration ranges. In one example, a UAV may not be permitted to hover within a designated airspace. The UAV may be required to fly above a minimum translational speed of 0 mph. In another example, a UAV may not be permitted to fly too quickly (e.g., fly beneath a maximum speed limit of 40 mph). The movement of the UAV may be governed with respect to a flight restriction region.

The flight response measures may govern take-off and/or landing procedures for the UAV. For instance, the UAV may be permitted to fly, but not land in a flight restriction region. In another example, a UAV may only be able to take-off in a certain manner or at a certain speed from a flight restriction region. In another example, manual take-off or landing may not be permitted, and an autonomous landing or take-off process must be used within a flight restriction region. The flight response measures may govern whether take-off is allowed, whether landing is allowed, any rules that the take-off or landing must comply with (e.g., speed, acceleration, direction, orientation, flight modes). In some embodiments, only automated sequences for taking off and/or landing are permitted without permitting manual landing or take-off, or vice versa. The take-off and/or landing procedures of the UAV may be governed with respect to a flight restriction region.

In some instances, the flight response measures may govern operation of a payload of a UAV. The payload of the UAV may be a sensor, emitter, or any other object that may be carried by the UAV. The payload may be powered on or off. The payload may be rendered operational (e.g., powered on) or inoperational (e.g., powered off). Flight response measures may comprise conditions under which the UAV is not permitted to operate a payload. For example, in a flight restriction region, the flight response measures may require that the payload be powered off. The payload may emit a signal and the flight response measures may govern the nature of the signal, a magnitude of the signal, a range of the signal, a direction of signal, or any mode of operation. For example, if the payload is a light source, the flight response measures may require that the light not be brighter than a threshold intensity within a flight restriction region. In another example, if the payload is a speaker for projecting sound, the flight response measures may require that the speaker not transmit any noise outside a flight restriction region. The payload may be a sensor that collects information, and the flight response measures may govern a mode in which the information is collected, a mode about how information is pre-processed or processed, a resolution at which the information is collected, a frequency or sampling rate at which the information is collected, a range from which the information is collected, or a direction from which the information is collected. For example, the payload may be an image capturing device. The image capturing device may be capable of capturing static images (e.g., still images) or dynamic images (e.g., video). The flight response measures may govern a zoom of the image capturing device, a resolution of images captured by the image capturing device, a sampling rate of the image capturing device, a shutter speed of the image capturing device, an aperture of the image capturing device, whether a flash is used, a mode (e.g., lighting mode, color mode, still vs. video mode) of the image capturing device, or a focus of the image capturing device. In one example, a camera may not be permitted to capture images in over a flight restriction region. In another example, a camera may be permitted to capture images, but not capture sound over a flight restriction region. In another example, a camera may only be permitted to capture high-resolution photos within a flight restriction region and only be permitted to take low-resolution photos outside the flight restriction region. In another example, the payload may be an audio capturing device. The flight response measures may govern whether the audio capture device is permitted to be powered on, sensitivity of the audio capture device, decibel ranges the audio capture device is able to pick up, directionality of the audio capture device (e.g., for a parabolic microphone), or any other quality of the audio capture device. In one example, the audio capture device may or may not be permitted to capture sound within a flight restriction region. In another example, the audio capture device may only be permitted to capture sounds within a particular frequency range while within a flight restriction region. The operation of the payload may be governed with respect to a flight restriction region.

The flight response measures may govern whether a payload can transmit or store information. For instance, if the payload is an image capturing device, the flight response measures may govern whether images (still or dynamic) may be recorded. The flight response measures may govern whether the images can be recorded into an on-board memory of the image capture device or a memory on-board the UAV. For instance, an image capturing device may be permitted to be powered on and showing captured images on a local display, but may not be permitted to record any of the images. The flight response measures may govern whether images can be streamed off-board the image capture device or off-board the UAV. For instance, flight response measures may dictate that an image capture device on-board the UAV may be permitted to stream video down to a terminal off-board the UAV while the UAV is within a flight restriction region, and may not be able to stream video down when outside a flight restriction region. Similarly, if the payload is an audio capture device, the flight response measures may govern whether sounds may be recorded into an on-board memory of the audio capture device or a memory on-board the UAV. For instance, the audio capture device may be permitted to be powered on and play back captured sound on a local speaker, but may not be permitted to record any of the sounds. The flight response measures may govern whether the images can be streamed off-board the audio capture device, or any other payload. The storage and/or transmission of collected data may be governed with respect to a flight restriction region.

In some instances, the payload may be an item carried by the UAV, and the flight response measures may dictate the characteristics of the payload. Examples of characteristics of the payload may include dimensions of the payload (e.g., height, width, length, diameter, diagonal), weight of the payload, stability of the payload, materials of the payload, fragility of the payload, or type of payload. For instance, the flight response measures may dictate that the UAV may carry the package of no more than 3 lbs while flying over a flight restriction region. In another example, the flight response measures may permit the UAV to carry a package having a dimension greater than 1 foot only within a flight restriction region. Another flight response measures may permit a UAV to only fly for 5 minutes when carrying a package of 1 lb or greater within a flight restriction region, and may cause the UAV to automatically land if the UAV has not left the flight restriction region within the 5 minutes. Restrictions may be provided on the type of payloads themselves. For example, unstable or potentially explosive payloads may not be carried by the UAV. Flight restrictions may prevent the carrying of fragile objects by the UAV. The characteristics of the payload may be regulated with respect to a flight restriction region.

Flight response measures may also dictate activities that may be performed with respect to the item carried by the UAV. For instance, flight response measures may dictate whether an item may be dropped off within a flight restriction region. Similarly flight response measures may dictate whether an item may be picked up from a flight restriction region. A UAV may have a robotic arm or other mechanical structure that may aid in dropping off or picking up an item. The UAV may have a carrying compartment that may permit the UAV to carry the item. Activities relating to the payload may be regulated with respect to a flight restriction region.

Positioning of a payload relative to the UAV may be governed by flight response measures. The position of a payload relative to the UAV may be adjustable. Translational position of the payload relative to the UAV and/or orientation of the payload relative to the UAV may be adjustable. Translational position may be adjustable with respect to one, two, or three orthogonal axes. Orientation of the payload may be adjustable with respect to one, two, or three orthogonal axes (e.g., pitch axis, yaw axis, or roll axis). In some embodiments, the payload may be connected to the UAV with a carrier that may control positioning of the payload relative to the UAV. The carrier may support the weight of the payload on the UAV. The carrier may optionally be a gimbaled platform that may permit rotation of the payload with respect to one, two, or three axes relative to the UAV. One or more frame components and one or more actuators may be provided that may effect adjustment of the positioning of the payload. The flight response measures may control the carrier or any other mechanism that adjusts the position of the payload relative to the UAV. In one example, flight response measures may not permit a payload to be oriented facing downward while flying over a flight restriction region. For instance, the region may have sensitive data that it may not be desirable for the payload to capture. In another example, the flight response measures may cause the payload to move translationally downward relative to the UAV while within a flight restriction region, which may permit a wider field of view, such as panoramic image capture. The positioning of the payload may be governed with respect to a flight restriction region.

The flight response measures may govern the operation of one or more sensors of an unmanned aerial vehicle. For instance, the flight response measures may govern whether the sensors are turned on or off (or which sensors are turned on or off), a mode in which information is collected, a mode about how information is pre-processed or processed, a resolution at which the information is collected, a frequency or sampling rate at which the information is collected, a range from which the information is collected, or a direction from which the information is collected. The flight response measures may govern whether the sensors can store or transmit information. In one example, a GPS sensor may be turned off while a UAV is within a flight restriction region while vision sensors or inertial sensors are turned on for navigation purposes. In another example, audio sensors of the UAV may be turned off while flying over a flight restriction region. The operation of the one or more sensors may be governed with respect to a flight restriction region.

Communications of the UAV may be controlled in accordance with one or more flight response measures. For instance, the UAV may be capable of remote communication with one or more remote devices. Examples of remote devices may include a remote controller that may control operation of the UAV, payload, carrier, sensors, or any other component of the UAV, a display terminal that may show information received by the UAV, a database that may collect information from the UAV, or any other external device. The remote communications may be wireless communications. The communications may be direct communications between the UAV and the remote device. Examples of direct communications may include WiFi, WiMax, radiofrequency, infrared, visual, or other types of direct communications. The communications may be indirect communications between the UAV and the remote device which may include one or more intermediary device or network. Examples of indirect communications may include 3G, 4G, LTE, satellite, or other types of communications. The flight response measures may dictate whether remote communications are turned on or off. Flight response measures may comprise conditions under which the UAV is not permitted to communicate under one or more wireless conditions. For example, communications may not be permitted while the UAV is within a flight restriction region. The flight response measures may dictate a communication mode that may or may not be permitted. For instance, the flight response measures may dictate whether a direct communication mode is permitted, whether an indirect communication mode is permitted, or whether a preference is established between the direct communication mode and the indirect communication mode. In one example, only direct communications are permitted within a flight restriction. In another example, over a flight restriction region, a preference for direct communications may be established as long as it is available, otherwise indirect communications may be used, while outside a flight restriction region, no communications are permitted. The flight response measures may dictate characteristics of the communications, such as bandwidth used, frequencies used, protocols used, encryptions used, devices that aid in the communication that may be used. For example, the flight response measures may only permit existing networks to be utilized for communications when the UAV is within a predetermined volume. The flight response measures may govern communications of the UAV with respect to a flight restriction region.

Other functions of the UAV, such as navigation, power usage and monitoring, may be governed in accordance with flight response measures. Examples of power usage and monitoring may include the amount of flight time remaining based on the battery and power usage information, the state of charge of the battery, or the remaining amount of estimated distance based on the battery and power usage information. For instance, the flight response measures may require that a UAV in operation within a flight restriction region have a remaining battery life of at least 3 hours. In another example, the flight response measures may require that the UAV be at least at a 50% state of charge when outside a flight restriction region. Such additional functions may be governed by flight response measures with respect to a flight restriction region.

The flight restriction region may be static. Alternatively, the boundaries of the flight restriction region may change over time. For instance, a flight restriction region may be a school, and the boundaries for the flight restriction region may encompass the school during school hours. After school hours, the boundaries may shrink or the flight restriction region may be removed. A flight restriction region at a nearby park where children participate in after-school activities may be created during the hours after school. The flight response measures associated with the flight restriction regions may remain the same over time, or may change over time. Changes may be dictated by time of day, day of the week, week of the month, month, quarter, season, year, or any other time-related factor. Information from a clock which may provide time of day, date, or other time-related information may be used in effecting the changes in the boundaries or the rules. A set of flight response measures may have dynamic components in response to other factors, in addition to time. Examples of other factors may include climate, temperature, detected light level, detected presence of individuals or machines, environmental complexity, physical traffic (e.g., land-bound traffic, pedestrian traffic, aerial vehicle traffic), wireless or network traffic, detected degree of noise, detected movements, detected heat signatures, or any other factor.

A flight restriction region may elicit any type of flight response measure by the UAV. For instance, the UAV may change course. The UAV may automatically enter an autonomous or semi-autonomous flight control mode from a manual mode, or may not respond to certain user inputs. The UAV may permit another user to take over control of the UAV. The UAV may automatically land or take-off. The UAV may send an alert to a user. The UAV may automatically slow down or speed up. The UAV may adjust operation (which may include ceasing operation, or changing parameter of operation of) of a payload, carrier, sensor, communication unit, navigation unit, power regulation unit. The flight response measure may happen instantaneously, or may occur after a period of time (e.g., 1 minute, 3 minutes, 5 minutes, 10 minutes, 15 minutes, 30 minutes). The period of time may be a grace period for the user to react and exercise some control over the UAV before the flight response measures kick in. For instance, if the user is approaching a flight restricted region, the user may be alerted and may change course of the UAV to exit the flight restricted region. If the user does not respond within the grace period, the UAV may be automatically landed within the flight restricted region. A UAV may normally operate in accordance with one or more flight commands from a remote controller operated by a remote user. The flight response measures may override the one or more flight commands when the set of flight response measures and the one or more flight commands conflict. For example, if the user instructs the UAV to enter a no-fly zone, the UAV may automatically alter course avoid the no-fly zone.

The parameter of flight restriction regions may include a type, or category of the flight restriction region. In some instances, a category of the flight restriction region may be manually input by a user. Alternatively, the category may be selected automatically with aid of one or more processors, without requiring user input. In some instances, some user input may be provided, but one or more processors may make the final determination of the category. In some instances, there may be a list of categories from which a user may select from. The list may be predetermined. The list may comprise, about two, three, four, five, six, seven, eight, nine, ten, twenty, forty or more category of restricted-regions. The various categories of flight restriction regions may include airports, military bases, borders, public sensitive areas, private residence, commercial region (e.g., commercial property) and the like. Depending on the selected category, a user may need to provide a different verification as described further below. For example, no verification may be necessary to designate a flight restricted region as private residence; however, some verification or identification may be necessary to designate a flight restricted region as an airport.

Figure 2:
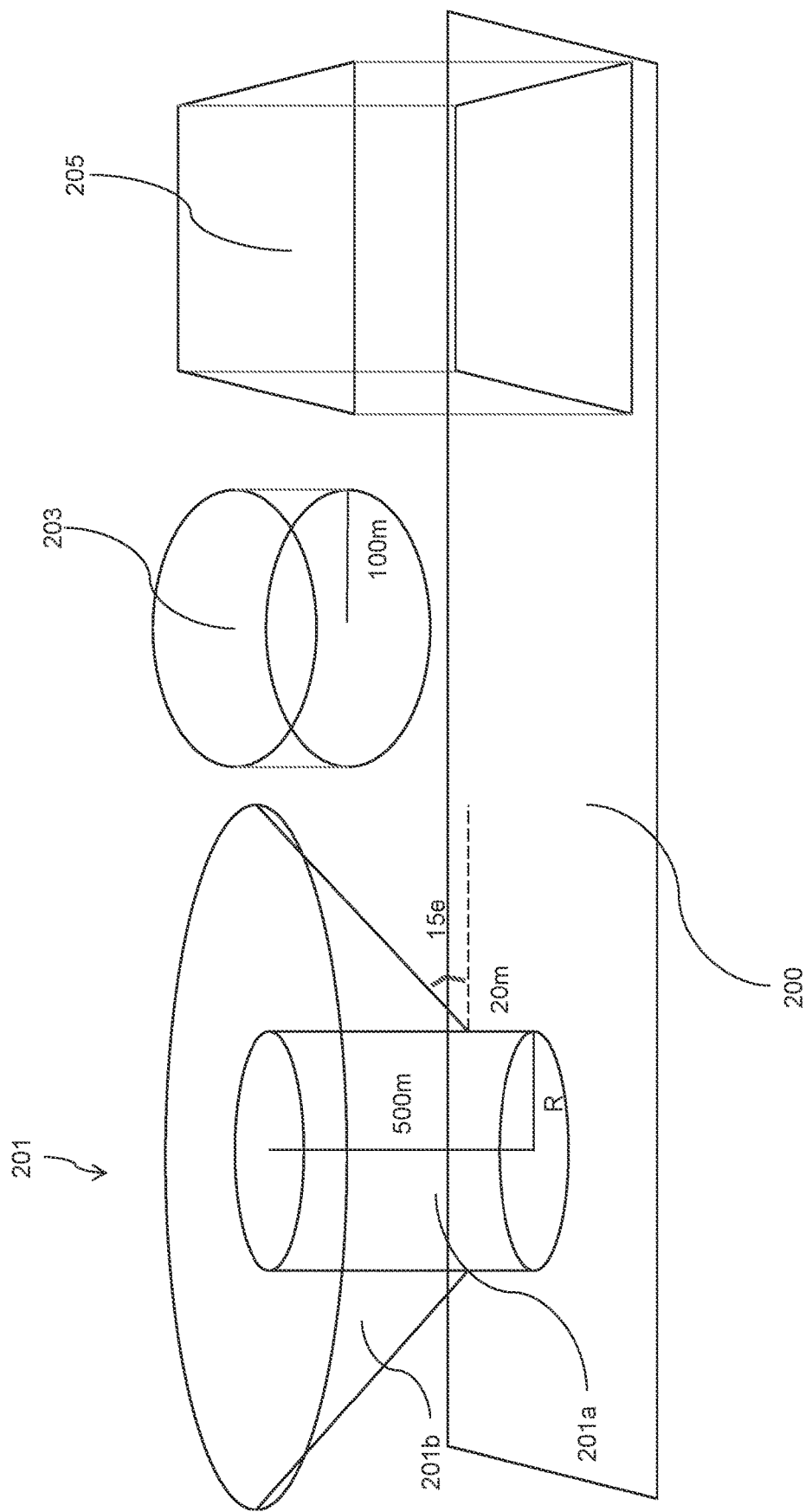
FIG. 2 provides three-dimensional shapes of flight restriction regions of different categories, in accordance with embodiments.

FIG. 2 provides three-dimensional shapes of flight restriction regions of different categories relative to ground level 200. Categories of flight restriction regions may be types of properties or regions. Different types of entities (e.g., government entities, private entities, private individuals, public entities, etc) may control different types of categories. The different categories may have a same three-dimensional size, shape, and/or orientation associated with it. For example, a military flight restriction region and a private residence flight restriction region may both have cylindrical shapes but a different size. For example, a public sensitive area and a private residence may both have a flight restriction region of cylindrical shapes and same sizes. The different categories (e.g., airport, private residence, borders, military bases, etc) may have a different three-dimensional size, shape, and/or orientation associated with it. For example, an airport flight restriction zone may have a shape 201 while a private residence may have a shape 205. Flight restriction regions of the same category may have a same three-dimensional size, shape, and/or orientation associated with it. For example, all airport flight restriction regions may have a shape 201 but a different size. For example, all military flight restriction regions may have a shape 203 and identical sizes. Flight restriction regions of the same category may have a different three-dimensional size, shape, and/or orientation associated with it. For example, some private residence flight restriction regions may have a shape 203 while other private residence flight restrictions may have a shape 205.

The three-dimensional size and shape may correspond to the boundaries of the flight restriction regions for each of the categories. The three-dimensional shape of each category may be regularly shaped (e.g., mathematically definable) or irregularly shaped. Each category may not have a predetermined size and/or shape associated with it. Each category may have a predetermined size and/or shape associated with it, as further described below. For example, a category may have a radius and altitude limit associated with it. The altitude limit may be an altitude ceiling (e.g., height above which a UAV may operate in), and/or an altitude floor (e.g., height below which a UAV may operate in). For example, a category may have an associated shape (e.g., shape 201 described below) but no size associated with it. For example, a category may have no predetermined shape, and the shape may depend on other information, such as property boundary lines.

The different categories may be associated with a different corresponding three-dimensional space. A flight restriction region categorized as an airport may have a three-dimensional shape 201 comprised of an inner region 201a and an outer region 201b. In some instances, The inner region may have any shape. Alternatively, the inner region may have a substantially circular shape. For example, the inner region may have a cylindrical shape, with a circular base having a radius R. R may greater than or equal to about 0.2 miles, 0.5 miles, 1 mile, 1.5 miles, 2 miles, or 5 miles. In some implementations the inner region may extend from a ground level upwards indefinitely, or beyond a height at which a UAV can fly. In some implementations, the inner region may extend from a ground level upwards to about 10 m, 50 m, 100 m, 250 m, 500 m, 750 m, or 1000 m.

The outer region may be provided around the inner region. For example, the outer region may begin outside radius R and at a first height. The first height may be about or more than 0 m, 5 m, 10 m, 20 m, 40 m, 80 m, or 100 m. The outer region may further extend outwardly (e.g., radially) at a predetermined elevation until reaching a second height. The predetermined elevation may be greater than or equal to about 5°, 10°, 15°, 30°, 45°, or 70°. The predetermined elevation may be lesser than or equal to about 5°, 10°, 15°, 30°, 45°, or 70°. The second height may be greater than or equal to about 10 m, 50 m, 100 m, 250 m, 500 m, 750 m, or 1000 m. In some embodiments, the outer region may extend upwards indefinitely, or beyond a height at which a UAV can fly. In some implementations, the outer region may extend upwards to about 10 m, 50 m, 100 m, 250 m, 500 m, 750 m, or 1000 m. The outer region 201b may have a substantially upside down cone shape as shown in FIG. 2.

Other categories of flight restriction regions may have a different size and shape associated with it. A flight restriction region categorized as a military base may have a flight restriction region defined by a cylindrical shape having a base with a predetermined radius and extending from the ground to a predetermined height. For example, the predetermined radius may be greater than or equal to about 10 m, 20 m, 50 m, 100 m, 200 m, 500 m, or 1000 m. For example, the predetermined height may be greater than or equal to about 10 m, 50 m, 100 m, 250 m, 500 m, 750 m, or 1000 m.

Figure 3:
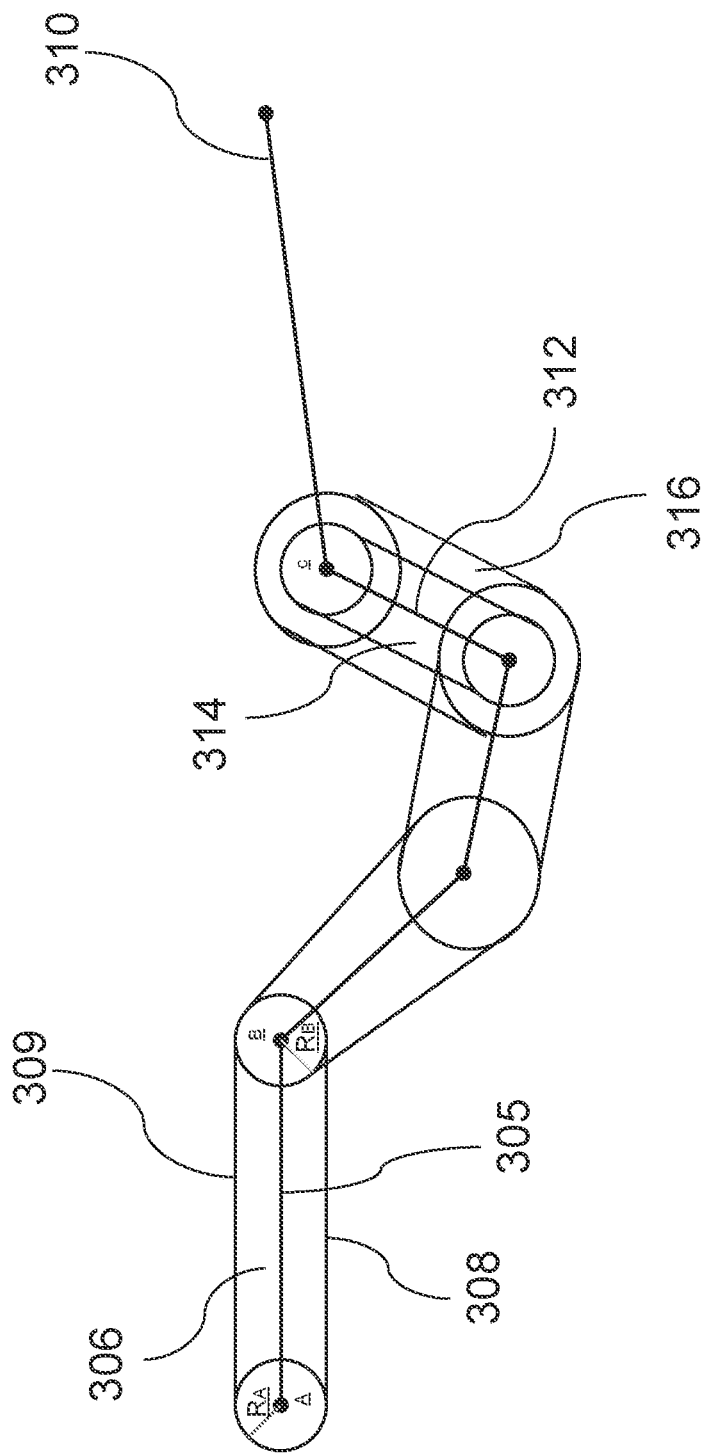
FIG. 3 provides a flight restriction region defined by a plurality of flight restriction strips, in accordance with embodiments.

A flight restriction region categorized as a border may have a flight restriction region defined by a plurality of cylinders or flight restriction strips. FIG. 3 provides a flight restriction region defined by a plurality of flight restriction strips. The size or shape of the flight restriction region may be selected based on a shape of the boundary. Data regarding a location of a boundary may be acquired using one or more processors. For example, the one or more processors may download (e.g., automatically or on command) a location or information regarding boundaries from a database, such as a third party data source. For example, a user may input data regarding the location of a boundary. In some instances, the user may be an authorized user, as described herein. Boundaries of a region may be represented as a collection points connected by lines. The points along a boundary may be manually determined. In some instances, the points along a boundary may be manually controlled by the user. The points along the boundary may be automatically determined. For example, one or more processors may select a plurality of points along the boundary. The points may be selected based on a shape of the boundary. The points along the boundary may be determined in advance or in real time. The points along the boundary may be determined based on coordinate points of the boundary (e.g., received through a local map of an environment). For example, the points along the boundary may be determined based on a change in the coordinate points (e.g., change in longitude and/or latitude) along the boundary. The points along the boundary may be equidistant from each other. The points along the boundary may be of unequal distance between each other. Boundary 310 is composed of five straight lines, each line with two end points. Each straight line of a boundary may be referred to herein as a flight restriction line. Each flight restriction line may represent a longitudinal axis of a flight restricted strip. For example, flight restriction line 305 represents a longitudinal axis of flight restricted strip 306. A flight restricted strip may be generated from the points along the boundary that were determined using one or more processors.

A flight-restricted strip may be defined by two circles each with a respective radius R1 and R2 and each respectively centered at the two end points of the flight restriction line. The two circles may be connected by two lines running tangent to the two circles. The area encompassed by the two circles and the tangent lines may represent a flight restricted strip. For example, flight restricted strip 306 is defined by an area encompassed by a circle of radius RA centered at point A, a circle of radius $R_B$ centered at point B, and lines 308 and 309 tangent to the two circles. The two end points of the flight restriction line may be provided as a pair. Thus flight restricted strips may accurately mimic the intended boundary region and a flight restricted strip that is unintended (e.g., extending from point B to point C in FIG. 3) may not arise. While flight restricted strip 306 is defined by two circles centered at points A and B, the circular shape is not meant to be limiting and it is to be understood that any shape may be used, such as a square, trapezoid, rectangle, etc. In such a case, the flight restricted region may be defined by the shape centered at the two ends and two lines tangent to the two shapes.

Radius R1 and R2 may be configurable in a database. Radius R1 and R2 may or may not be equal. Radius R1 and R2 may be set to give the flight restricted strip a width. Radius R1 and R2 may be set at any desired radius. The radius may depend on the type of flight restricted region under consideration. For example, for a flight restricted region having to do with a national border, the radius may be about or less than 100 km, 50 km, 25 km, 10 km, 5 km, 2 km, or 1 km. For example, for a flight restricted region having to do with boundaries of an airport, the radius may be about or less than 500 m, 200 m, 100 m, 50 m, 20 m, 10 m, or 5 m. Alternatively or in conjunction, the radius may be selected based on a shape (e.g., angularities) of the boundary itself. For example, for a twisting or looping boundary, a larger radius may be selected to cover the whole loop. Alternatively or in conjunction, the radius may be selected based on real world considerations. For example, if there is a territorial dispute between two countries, a larger radius such as 100 km may be set to ensure a broader area is covered by the flight restricted strip. Radius R1 and R2 may each be about or less than 50 km, 25 km, 10 km, 5 km, 2 km, 1 km, 500 m, 200 m, 100 m, 50 m, 20 m, 10 m, or 5 m. The radius may give a width or a buffer such that the UAV cannot fly too close to the flight restricted region or the flight restricted strip. For example, the radius may give a width or a buffer to the flight restricted strip such that a UAV cannot fly too close to a national border or an airport.

The length of a flight restricted strip (e.g., length of line 305 for flight restricted strip 306) may depend on the type of flight restricted region under consideration. For example, for a flight restricted region having to do with a national border, the length of each flight restricted strip may be about or less than 500 km, 200 km, 100 km, 65 km, 50 km, 25 km, 10 km, 5 km, 2 km, or 1 km. For example, for a flight restricted region having to do with boundaries of an airport, the length of each flight restricted strip may be about or less than 10,000 ft, 5,000 ft, 2,000 ft, 1,000 ft, 500 ft, 200 ft, or 100 ft. Alternatively or in conjunction, the length of a flight restricted strip may be selected based on a shape of the boundary itself. For example, for a twisting or looping boundary, a smaller length may be selected to closely trace the boundary. The length of each flight restricted strip may be about or less than 500 km, 200 km, 100 km, 65 km, 50 km, 25 km, 10 km, 5 km, 2 km, 1 km, 2,000 ft, 1,000 ft, 500 ft, 200 ft, or 100 ft.

A flight restriction line may have one or more flight restricted strips associated with it. For example, FIG. 3 shows flight restriction line 312 having two flight restricted strips 314, 316 associated with it. Each flight restriction line may have one, two, three, four, five, or more flight restricted strips associated with it. A UAV may take a different flight response measure depending on the flight restricted strip it is in. For example, a UAV may be barred from laterally moving into flight restricted strip 214*e*. If the UAV is within flight restricted strip 214*e*, a first flight response measure may be taken (e.g., automatically land). If the UAV is within flight restricted strip 216*e*, a second flight response may be taken (e.g. prompt an operator of the UAV to land within a predetermined time period). The flight response measure may affect operation of the UAV. The flight response measure may take control of the UAV away from the user, may provide a user limited time to take corrective action before taking control of the UAV away from the user, impose an altitude restriction, and/or may provide an alert or information to the UAV.

A flight restriction region categorized as a private residence may have a three dimensional shape 203 that resembles a cylinder with a base having a predetermined radius and a set of low and high altitude limits (e.g., altitude floors and an altitude ceiling). For example, the predetermined radius may be greater than or equal to about 10 m, 20 m, 50 m, 100 m, 200 m, 500 m, or 1000 m. For example, the altitude floor may be lesser than or equal to about 2 m, 5 m, 10 m, 15 m, 20 m, 30 m, 40 m, 50 m, 75 m, 100 m, 150 m, 200 m, 300 m, 400 m, 500 m, 750 m, or 1000 m. For example, the altitude ceiling may be greater than or equal to about 2 m, 5 m, 10 m, 15 m, 20 m, 30 m, 40 m, 50 m, 75 m, 100 m, 150 m, 200 m, 300 m, 400 m, 500 m, 750 m, or 1000 m. For such a flight restriction region, a UAV may be able to fly above a certain height or below a certain altitude, or may be restricted in the space in between. In some instances, a flight restriction region categorized as a private residence may have a three-dimensional shape 205. For example, the boundary of the flight restriction region may be defined by the property line (e.g, accessible from public or private records or received from a user) and a predetermined height limit (e.g., set of low limit and a set of high limit).

The different categories may have different sets of flight response measures associated with it. The different categories may be associated with any corresponding flight response measures as described herein. For example, a set of flight response measures associated with a flight restriction region categorized as an airport may prohibit a UAV from entering the flight restriction region. In contrast, a UAV may be issued a warning signal if entering a flight restriction region that is categorized as a private residence but be allowed to enter the flight restriction region. In some instances, a UAV may be allowed to enter a flight restriction region that is categorized as a private residence but the sensors (e.g., camera) on the UAV may be inoperable while in the flight restriction region.

Referring back to FIG. 1, in step 104, a three-dimensional space for each of the flight restriction regions may be determined with aid of one or more processors. The three-dimensional space may be of any shape and size. The three-dimensional space may depend on the input parameters of the flight restriction regions. In some instances, the user input parameters may be sufficient to generate or determine the three-dimensional space. For example, if the user input parameters included a radius, altitude limit (e.g., ceiling, floor), and location of the flight restriction region, the three-dimensional space may be defined by a cylinder with a base centered at the location. Other exemplary shapes of the three-dimensional may include, but not be limited to, a sphere, semi-sphere, cube, rectangular prism, irregular shapes, and the like. If the user manually configured a shape (e.g., draw, trace or selected), the three-dimensional space may be defined by the configured shape. In some instances, if the user input parameters included a category and a location of the flight restriction region, the three-dimensional space of the flight restriction region may be defined as described herein (e.g., a corresponding predetermined three-dimensional space). In some instances, the user input parameters may be supplemented by preconfigured parameters to determine and/or store a three-dimensional space of the flight restriction region. For example, other parameters (e.g., parameters not input by a user) may be selected automatically with aid of one or more processors. For example, the user input may comprise of a location of the flight restriction region, and a preconfigured radius and/or altitude limit may be coupled to the location to determine the three-dimensional space of the flight restriction region. In some instances, the user input parameters may be insufficient to generate the three-dimensional space of the flight restriction region, and additional information may be extracted from external data sources, as described further below.

Figure 4:
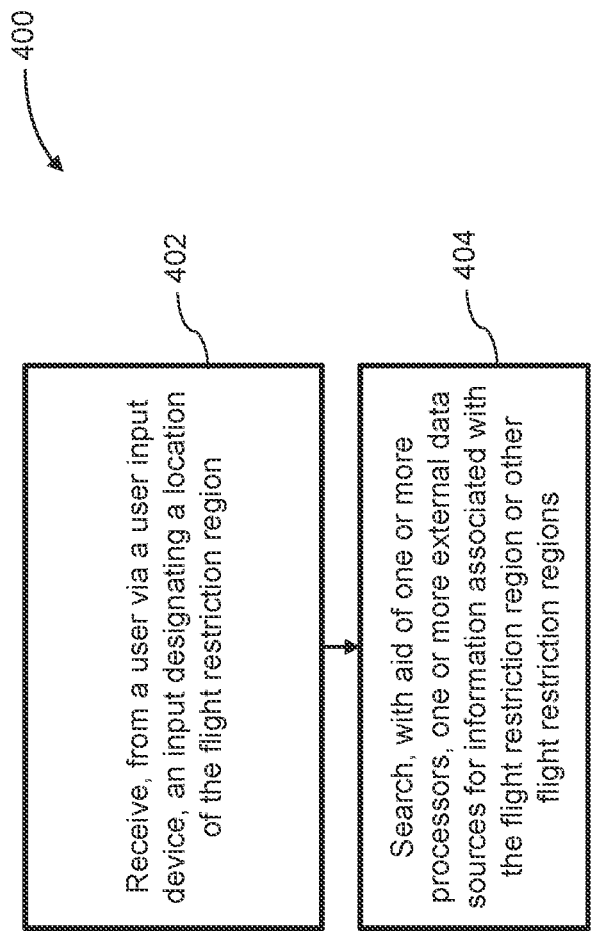
FIG. 4 provides a method of collecting information regarding a flight restriction region, in accordance with embodiments.

FIG. 4 provides a method 400 of collecting information regarding a flight restriction region, in accordance with embodiments. Similarly, a non-transitory computer readable medium containing program instructions for executing method 400 may be provided as well. Method 400 may provide a step 402 of pushing (e.g., by user) and 404 of pulling (e.g., by a processor coupled to the database) other flight restricted regions or information (e.g., other parameters) associated with flight restriction regions into a database.

In step 402, an input designating a location of the flight restriction region is received from a user via a user input device. One or more parameters of flight restriction regions as described herein may be provided (e.g., pushed) by the user input device, in previously described herein.

In step 404, one or more external data sources may be searched (e.g., pulled) with aid of one or more processors for information associated with the flight restriction region or other flight restriction regions. For example, the one or more processors may utilize a web crawler or spidering software to search external data sources. A web crawling or spidering software may systematically browse the World Wide Web in search of new or updated information regarding potential flight restriction regions (e.g., new airports, new government buildings, etc). The external data sources may include any source of information that is not input by a user. For example, the external data source may comprise government data sources, sources that list airport information, public records, sources that are publicly accessible over the internet, sources that are privately accessible when access is granted, and the like.

Step 404 may or may not be directly related to step 402. For example, without regards to any user input, one or more processors associated with a database for managing flight restriction regions may search for information about airports, military bases, other sensitive areas (e.g., public sensitive area), jurisdictional borders, and the like online. Based on the information (e.g., location of the airports, etc), other parameters of a flight restriction region (e.g., location, shape, size, etc) may be determined or generated and stored on the database. For example, one or more processors associated with the database may search for information regarding new sensitive areas since the database had been last updated. Step 404 may be related to the input by the user in step 402. For example, the search may be for any sensitive areas nearby the flight restriction region of the user input. Step 404 may directly depend on the parameters input by the user in step 402. For example, the user input may comprise a location of the flight restriction region.

The user input parameters may be insufficient to determine or generate the three-dimensional space of the flight restriction region, and additional information may be gathered from external data sources. For example, based on the location, one or more processors may search for information associated with (e.g., related to) the flight restriction region. The information related to the flight restriction may be, for example, the property boundary line of the given location. The three dimensional space may then be determined or generated based on the property line and an altitude limit (e.g., input by the user) or a predetermined altitude limit. Other information related to the flight restriction may be extracted from external data sources. For example, an ownership of the given location (e.g., flight restriction region), identity of the user, category or type of the flight restriction region, appropriate type of flight response measure, and the like may be extracted from the external data sources.

Information regarding the gathered other flight restriction regions or associated with the input flight restriction regions may further be stored in one or more memory units along with the parameters associated with the input flight restriction regions. The one or more memory units may be coupled with the database for flight restriction regions as mentioned herein.

Figure 5:
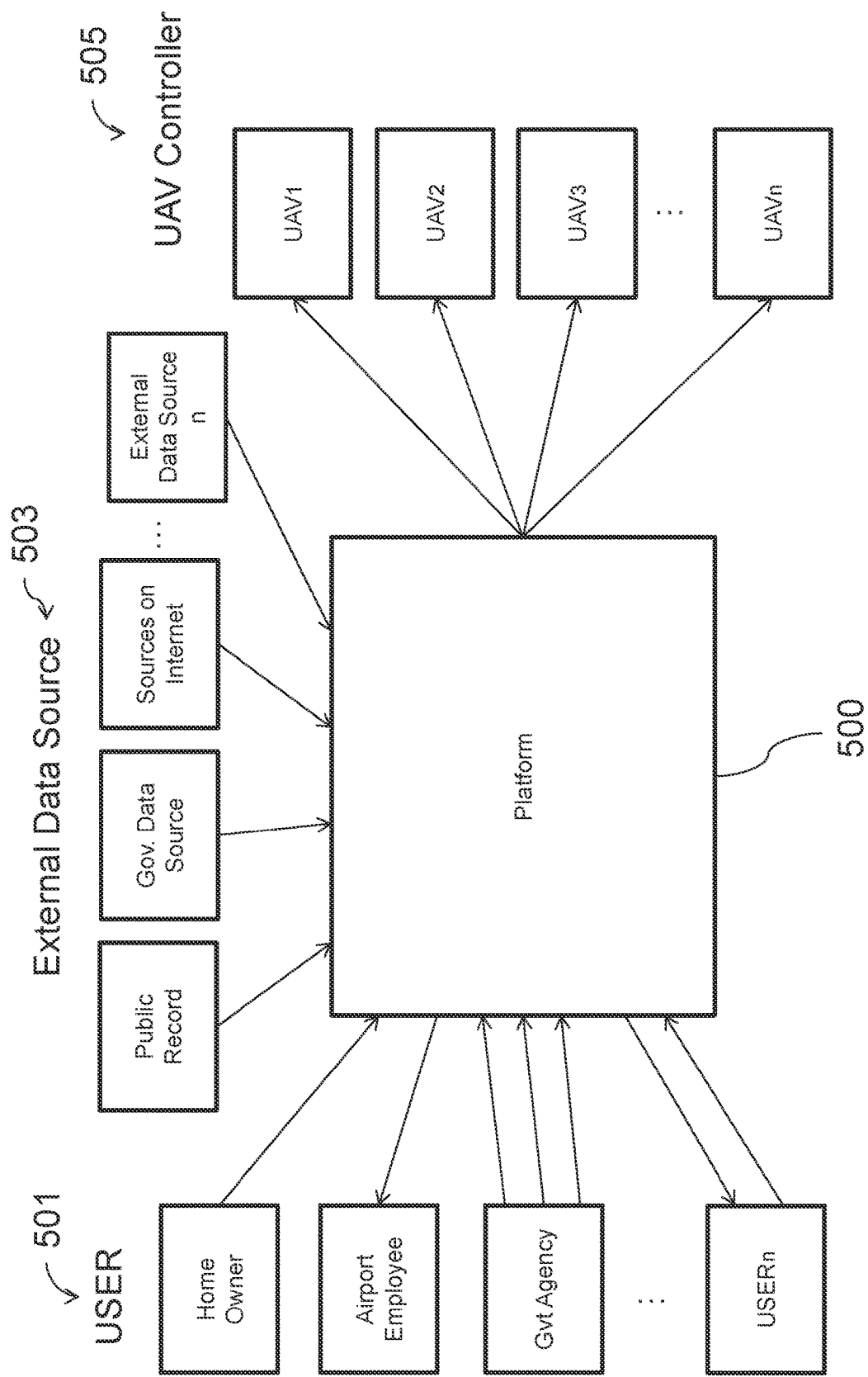
FIG. 5 provides a schematic of the flow of information from, and to the platform, in accordance with embodiments.

FIG. 5 provides a schematic of the flow of information from, and to the platform 500, in accordance with embodiments. The platform may receive input designating parameters of flight restriction regions. The input may be from one or more users 501 using a user input device. The user may be any individual or entity. For example, the user may be a home owner, airport employee, government agency, or any other entity. The user may input parameters of a desired flight restriction region. The user may not be limited in the number of flight restriction regions whose parameters the user may input. For example, a government agency, such as the DoD, may not be limited in the number of proposed flight restriction regions whose parameters they may input. In some instances, the user may be limited in the number of flight restriction regions whose parameters the user may input, as described elsewhere. For example, a home owner may be limited to inputting parameters of one proposed flight restriction region, one proposed flight restriction region per registration with a website, one proposed flight restriction region per proof of title to land, and the like. A user may be limited or not limited in the number of flight restriction regions whose parameters they may input based on a user type. A user type as used herein, may refer to a predetermined classification that a user may be subsumed under. For example, a user type may refer to an individual, government entity, home owner, property owner, verified individual, unverified individual, group, entity, and the like.

A user may access information from the platform. The platform may comprise one or more databases of flight restriction regions. The database may be coupled to programs, websites, or applications that are accessible to the user. For example, a user such as an airport employee may utilize a user terminal such as a computer, mobile device, cell phone, PDA, tablet, etc in order to access a website containing a list (e.g., table) of flight restriction regions. For example, a user may utilize a user terminal (e.g., comprising a display) to access a graphical user interface via website or application. The GUI may display a map (e.g., global or local map) wherein flight restriction regions contained in the database may be viewed. For example, the flight restriction regions may be viewed in two-dimensional or three-dimensional form. The GUI may further display parameters of the flight restriction regions. In some instances, a user may both access information contained in the database and input parameters of flight restriction regions on the GUI (e.g., through use of a user terminal). For example, the user may view a map on the GUI displaying flight restriction regions and trace a shape of the proposed flight restriction region on the map.

The platform may further access external data sources 503 to gather (e.g., pull) information regarding flight restriction regions. For example, the platform may utilize web crawlers or spidering softwares to systematically search for flight restriction regions. The database may be constantly updated through the user of such software. Information may be pulled from a single external source, multiple external sources, single type of external source, or multiple types of external sources. The different types of external sources may comprise government data sources, sources that list airport information, public records, sources that are publicly accessible over the internet, sources that are privately accessible when access is granted, and the like. The different types of external sources may be owned and/or operated by different entities. The different types of external sources may be owned and/or operated by the same entity.

Information regarding flight restriction regions may be information regarding other flight restriction regions unrelated to user input parameters of flight restriction regions. For example, the platform may utilize a webcrawler to search for information regarding parameters (e.g., location) of any new airports or public sensitive areas. Information regarding flight restriction regions may be information related to the user input flight restriction regions. For example, the parameters of flight restriction regions input by a home owner may be a location of a proposed flight restriction region. The platform may receive the information and utilize a web crawler to gather information regarding a property title information or property boundary lines associated with the location of the proposed flight restriction region.

The platform may further be utilized in the operation of UAVs. The platform may be accessed by UAV operators, or UAV controllers 505. For example, a UAV operator may utilize a user terminal (e.g., comprising a display) to access a graphical user interface via website or application. The GUI may display a map (e.g., global or local map) wherein flight restriction regions contained in the database may be viewed. For example, the flight restriction regions may be viewed in two-dimensional or three-dimensional form. The GUI may further display parameters of the flight restriction regions. In some instances, a UAV operator may both access information contained in the database and input parameters of flight restrictions regions on the GUI (e.g., through use of a user terminal) that the UAV operator desires. The parameters of flight restriction region input by the UAV operator may be personal to the UAV operator. For example, other users may not be able to access the parameters of flight restriction regions input by the UAV operator. The GUI may be utilized in operating a UAV. For example, the UAV operator may utilize the GUI in planning flight routes as mentioned herein.

The platform may be accessed directly by the UAV itself. For example, a UAV may utilize network connections (e.g., WiFi, 3G, 4G signals) to access the platform. The UAV may access information contained in the database and operate according to flight response measures associated with the flight restriction regions contained in the database.

Figure 6:
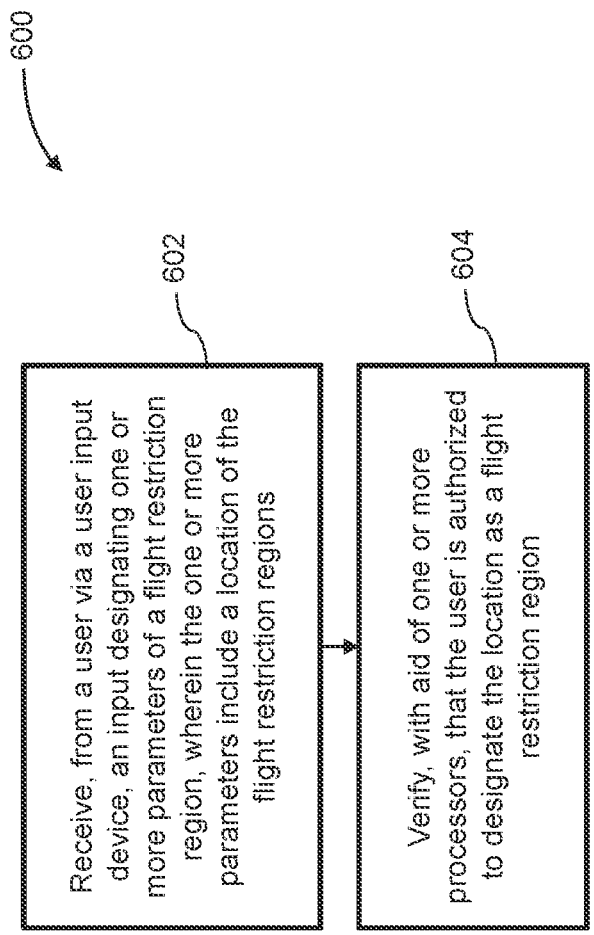
FIG. 6 provides a method of designating flight restriction regions, in accordance with embodiments.

FIG. 6 provides a method 600 of designating flight restriction regions, in accordance with embodiments. Similarly, a non-transitory computer readable medium containing program instructions for executing method 600 may be provided as well. In step 602, an input designating one or more parameters of a flight restriction region is received from a user via a user input device. The one or more parameters may include a location of a flight restriction region. The one or more parameters may include a user identifier (ID) or a real name of the user. The user identifier may uniquely identify or distinguish a user from other users.

In step 604, it may be verified that the user is authorized to designate the location as a flight restriction region with the aid of one or more processors. Verification may comprise an authentication, or approval process. The approval process may comprise verifying an identity of the user. The approval process may comprise verifying that the user is authorized to designate the location as a flight restriction region. The approval process may comprise both verifying an identity of the user and verifying that the user is authorized to designate the location as a flight restriction region. The identity of the user may be verified after it is verified that the user is authorized to designate the location as a flight restriction region. The identity of the user may be verified before it is verified that the user is authorized to designate the location as a flight restriction region. The identity of the user may be verified simultaneously while it is verified that the user is authorized to designate the location as a flight restriction region.

Different approval processes may exist and be employed for different flight restriction regions. Same approval processes may exist and be employed for different flight restriction regions. In some instances, verification may occur automatically with aid of one or more processors. For example, based on received input of step 602, the platform may search one or more external data sources utilizing web crawlers as described herein. Based on information gathered from the external data sources, verification may occur. For example, based on an input location of a proposed flight restriction region and an input user name, information regarding title to land may be gathered from public records to verify the user's control over the proposed flight restriction region and/or or an identity of the user. In some instances, verification may occur manually. For example, after a user submits parameters of a proposed flight restriction region, a person related to the platform or a third party may conduct a phone call with the user to verify the user's control over the proposed flight restriction region and/or an identity of the user. In some instances, a user may be required to submit additional documentation proving control over the flight restriction region and/or the identity of the user. Such additional documentation may be automatically or manually processed to verify that the user is authorized to designate a location as a flight restriction region. In some instances, verification may occur automatically without human input or independent of human input at the verification stage.

A user may be authorized to designate a location as a flight restriction region if the user exercises control over the flight restriction region. In some instances, a user may exercise control over the flight restriction region if the user is an owner of the flight restriction region. For example, an owner of a residential property (e.g., house, townhouse, apartment) or a commercial region or property (e.g., building, lot) may be authorized to designate the property as a flight restriction region. In some instances, a user may exercise control over the flight restriction region if the user is a resident or tenant of the flight restriction region. In some instances, a user may exercise control over the flight restriction region if the user is conveyed authority by a governing entity. For example, airport security may exercise control over a flight restriction region within or near an airport. For example, an employee of a government agency such as the Federal Aviation Administration (FAA), Federal Trade Commission (FTC), Federal Communications Commission (FCC), National Telecommunications and Information Administration (NTIA), Department of Transportation (DoT), or Department of Defense (DoD) may exercise control over a corresponding region relevant to the agency. For example, border patrol may exercise control over a flight restriction region within or near a national border. For example, a government official may exercise control over a flight restriction region within or near a corresponding government building. Verification may comprise confirming that the user exercises control over the flight restriction region. For example, a user may prove control over the flight restriction region by proving ownership over or residence of the proposed location (e.g., via title to land of the proposed flight restriction region, rental contract, credit card address, bank account address, address listed with employer, utility bill etc). For example, a user may prove control over the flight restriction region by proving granted authority (e.g., via email address, employment letter, phone call, etc).

A user identity may be authenticated or verified. For example, the identity of the user may be authenticated via a password, phrase, or code that is entered. For example, the identity of the user may be verified via a biometric input of the user. For example, the identity of the user may be verified by via proof of a unique object in possession of the user (e.g., title to land of the proposed flight restriction region). For example, the identity of the user may be verified via a utility bill of the location of the flight restriction region. For example, the identity of the user may be verified by via a phone call from the user.

Alternatively or in addition, other approval processes may be utilized. For example, the approval process may include receiving a declaration from the user that he exercises control over the flight restriction region. For example, the approval process may include the user registering with a website associated with the database as mentioned herein. For example, the approval process may include verifying an IP address, user ID, and/or email address associated with the user. A combination of the aforementioned approval processes may be utilized. For example, a user may be required to register with a website, verify his or her identity, and prove control over the flight restriction region to be able to designate flight restriction regions.

A degree or type of authentication or verification that is necessary may depend on the parameters of the flight restriction that is proposed. For example, the degree of verification necessary may depend on the size, shape, duration, flight response measure, category, and the like of the flight restriction that is proposed. For example, a larger size of the proposed flight restriction region may require a higher level of authentication or verification (e.g., more steps or more stringent process). For example, a more stringent degree of flight response measure proposed for the flight restriction region (e.g., no-fly zone) may require a higher level of authentication or verification. For example, a longer duration of the flight restriction region (e.g., indefinite) may require a higher level of authentication or verification. A higher level of authentication or verification as used herein may mean that more steps of verification are necessary. For example, a low level of authentication may comprise about or less than one, two, three, four, five steps of verification. For example a low level of authentication may comprise submitting a utility bill. For example, a high level of authentication may comprise about or more than two, three, four, five steps of verification. For example, a high level of authentication may comprise registering with a website, submitting a copy of the driver's license, and submitting a utility bill. A higher level of authentication or verification as used herein may mean that a more stringent process is necessary. For example, a lower level of verification may comprise registration with a website. For example, a high level of verification may comprise submitting title to property.

For example, as previously described, a category of the proposed flight restriction region may determine a degree or type of verification that is necessary. Different approval processes may exists and be employed for different categories of flight restriction regions. Same approval processes may exist and be employed for different categories of flight restriction regions. Different approval processes may exists and be employed for same categories of flight restriction regions. Same approval processes may exist and be employed for same categories of flight restriction regions. For example, for a flight restriction region having to do with a private residence, the approval process may entail receiving proof of title to land of the proposed flight restriction region, or the user registering with a website associated with the database. For example, for a flight restriction region having to do with a border, the approval process may entail verifying an IP address or email address of the user.

In some instances, a third party may verify that a user exercises control over the flight restriction region. For example, a third party may track property sales and titles. The third party may receive information from the user and/or database, verify that the user is authorized to designate the location as a flight restriction region, and send an electronic transmission confirming or denying that the user is an authorized user.

Flight restriction regions that have been verified as having been input by authorized users may be stored in the database of flight restriction regions. Flight restriction regions that have not been verified as having been input by authorized users may or may not be stored in the data base of flight restriction regions. Flight restriction regions that have been verified as having been input by authorized users may be accepted. Flight restriction regions that have not been verified as having been input by authorized users may be accepted or rejected. The acceptance or rejection of proposed flight restriction regions may happen in real time. The acceptance or rejection of proposed flight restriction regions may be delayed, or occur at predetermined time intervals. For example, the predetermined time intervals may be greater than or equal to about 1 minute, 5 minutes, 10 minutes, 30 minutes, 1 hour, 3 hours, 6 hours, 12 hours, 1 day, 3 days, 1 week, 2 weeks, or 1 month. For example, the delay may be greater than or equal to about 1 minute, 5 minutes, 10 minutes, 30 minutes, 1 hours, 3 hours, 6 hours, 12 hours, 1 day, 3 days, 1 week, 2 weeks, or 1 month of the user input regarding the flight restriction region.

Authenticated and unauthenticated flight restriction regions may be associated with different flight response measures as provided herein. An authenticated flight restriction region may refer to a flight restriction regions that have been verified as having input by authorized users. An unauthenticated flight restriction region may refer to flight restriction regions that have not been verified as having been input by authorized users. For example, an authenticated flight restriction region may be associated with flight response measures that prevent a UAV from going in to the flight restriction region, or with flight response measures that turn off sensors (e.g., cameras) on the UAV when entering the flight restriction region. The identification of the users may or may not have been verified for an authenticated flight restriction region. For example, an unauthenticated flight restriction region may be associated with flight response measures that provide an alert to the user but not with flight response measures that prevent a UAV from entering the flight restriction region or response measures that render payloads or sensors inoperable within the flight restriction regions.

Users as referred to herein may or may not be limited in the number of times they may submit an input (e.g., input designating parameters of flight restriction regions). For example, a user may be limited to submitting a single input (e.g., single location of flight restriction regions). For example, a user may be limited to a single input per registration (e.g., registration with a website associated with the database). For example, a user may be limited to a single input per verifiable email address. For example, a user may be limited to a single input per IP address. For example, a user may be limited to a single input per proof of ownership of a UAV. The limit on input may depend on a type or category of desired flight restriction region. For example, for a flight restriction region having to do with a private residence, a user may be limited to a single input per title to land. For example, for a flight restriction region having to do with a border a user may not be limited in the number of inputs that they may submit.

The flight restriction regions as referred to herein may last indefinitely. Alternatively, the flight restriction regions as referred to herein may be temporary. The flight restriction region may exists for a period of time. The period of time may be of a predetermined length (e.g., for 10 minutes). For example the predetermined period of time may be 1 minute, 2 minute, 5 minutes, 10 minutes, 15 minutes, 30 minutes, 60 minutes, 120 minutes, 180 minutes, 6 hours, 12 hours, 1 day, 1 week, 1 month, 3 months, 6 months, 1 year, or indefinite. The predetermined length may begin when a flight restriction region (e.g., input designating parameters of flight restriction regions) are input and last for a certain length. Alternatively or in addition, the predetermined length may be from a specified starting time to an ending time (e.g., unrelated to the time of user input). For example, predetermined length may be from 2:00 pm to 3:00 pm on Mar. 1, 2020.

The period of time may be determined based on one or more set conditions. The set conditions may or may not relate to a time frame. For example, the set condition may be during a special event, such as a national holiday or during a presidential candidate campaign period. For example, the set condition may be during a period of time in which an entity holds a meeting (e.g., governmental entity such as the White House holding a meeting or the United Nations holding a meeting) or when a meeting is being held in or near an specified area (e.g., press conference being held in or near a building). The set condition may be related to external conditions or events. The set condition may or may not be predictable. For example, the set period of time may be determined based on conditions having to do with the weather (e.g., rain, snow, sunshine, windy, etc), traffic conditions, earthquakes, national emergencies, and the like. The set conditions may relate to a predetermined time frame. For example, the set condition may be during a press conference, which is scheduled from 2:00 µm to 4:00 pm on Mar. 1, 2015.

The period of time may be arbitrary and any period of time may be designated. The period of time may be recurring. For example, the period of time may be every 2nd Saturday of the month, Tuesday of every week, and the like. The flight restriction region may last or not last in accordance with a schedule which may include irregular time periods. Data regarding the schedule may be pulled from a calendar (e.g., personal or global), the internet, the news, etc. The set condition and/or the predetermined length may be a parameter of the flight restriction region input by the user (e.g., in step 102 of method 100). The set condition and/or the predetermined length may be assigned independently of any user input.

Outside of the period of time the flight restriction region may be cancelled or be null. For example, the flight restriction region may no longer display on the user interface previously described. For example, the flight restriction region may no longer be associated with a set of flight response measures or flight response measures outside of the period of time. The flight restriction region may be associated with a different set of flight response measures or flight response measures when outside of the period of time. For example, within the period of time, a set of flight response measures associated with the flight restriction region may prevent a UAV from operating within the flight restriction region. Outside of the period of time, the UAV a different set of flight response measures may apply (e.g., you may operate the UAV within the flight restriction region but may receive a warning) or there may be no sets of flight response measures associated with the region. For example, if the period of time is defined as the duration of time the white house is holding a public event, the UAVs may freely fly during the period of time; however, outside of the period of time, the set of flight response measures associated with the flight restriction region may prevent a UAV from operating within the flight restriction region.

Flight restriction regions may be stored in a database as described herein. For example, the parameters of the flight restriction region, such as the location and three-dimensional boundaries (e.g., radius, altitude limit, etc), may be stored in the database. The database may be constantly updated. The database may be updated in real time. For example, every time a user input is received or an external database is searched as described herein, the database may be updated. Alternatively, the database may be updated at predetermined intervals. For example, the database may be updated every minute, 30 minutes, hour, 12 hours, day, 5 days, 10 days, month, 3 months, 6 months, and the like. Flight restriction regions contained in the database may be edited.

Flight restriction regions within the database may expire. Flight restriction regions within the database may last indefinitely. For example, the flight restriction regions within the database may expire after about or more than 10 minutes, 30 minutes, 1 hour, 6 hours, 12 hours, 24 hours, 3 days, 1 week, 2 weeks, 1 month, 3 months, 6 months, 1 year, 2 years, and the like. Flight restriction regions than have been unauthenticated may expire. Certain categories of flight restriction regions may expire, but others may not. For example, flight restriction regions having a category of private residence may expire, but flight restriction regions having a category of airports may not. Flight restriction regions contained in the database may be renewed. For example, flight restriction regions that had been previously input by users may require a renewal for continued storage within the database. Flight restriction regions may be renewed prior to expiration. Flight restriction regions may be renewed after expiration. Flight restriction regions that have not been renewed may be canceled, or deleted from the database. Renewal may be required, for example, about or more than every 10 minutes, 30 minutes, 1 hour, 6 hours, 12 hours, 24 hours, 3 days, 1 week, 2 weeks, 1 month, 3 months, 6 months, 1 year, 2 years, and the like. Renewal may be required for unauthenticated flight restriction regions. Renewal may be required for certain flight restriction regions, but not for others. For example, flight restriction regions having to do with private residences may require renewal while flight restriction regions having to do with airports or national borders do not.

Flight restriction regions within the database may be edited. The edit may or may not be by the user that input the parameters of the flight restriction region. The edit may require verification or an approval process substantially as described herein. An edit may comprise cancelling the flight restriction region. An edit may comprise updating certain parameters of the flight restriction region. For example, the three-dimensional space of the flight restriction region may be edited to encompass a smaller or larger area than before. For example, the flight response of the flight restriction area may be edited.

Figure 7:
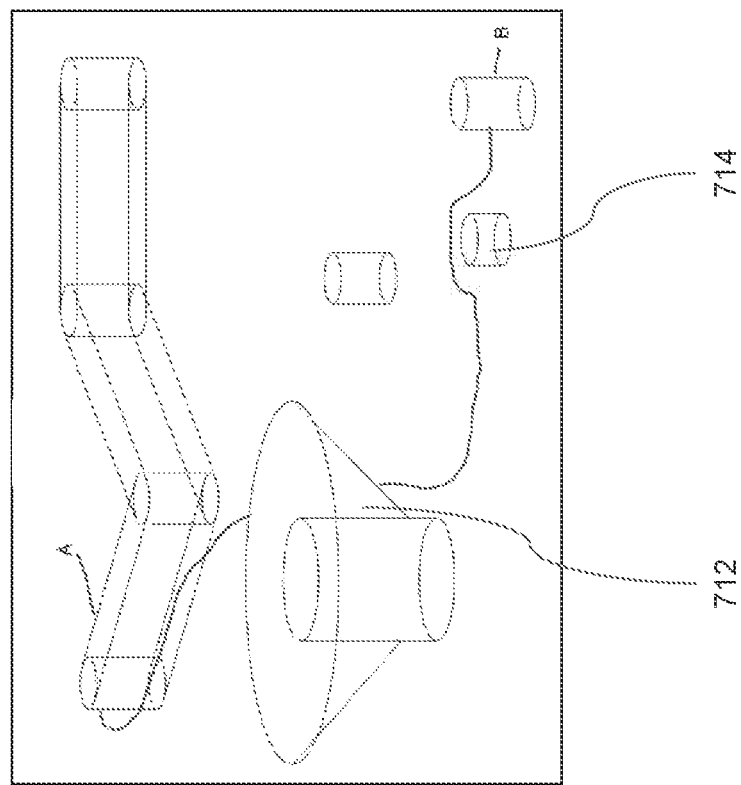
FIG. 7 provides a user interface including a two-dimensional view and three-dimensional view of flight restriction regions, in accordance with embodiments.
Figure 7:
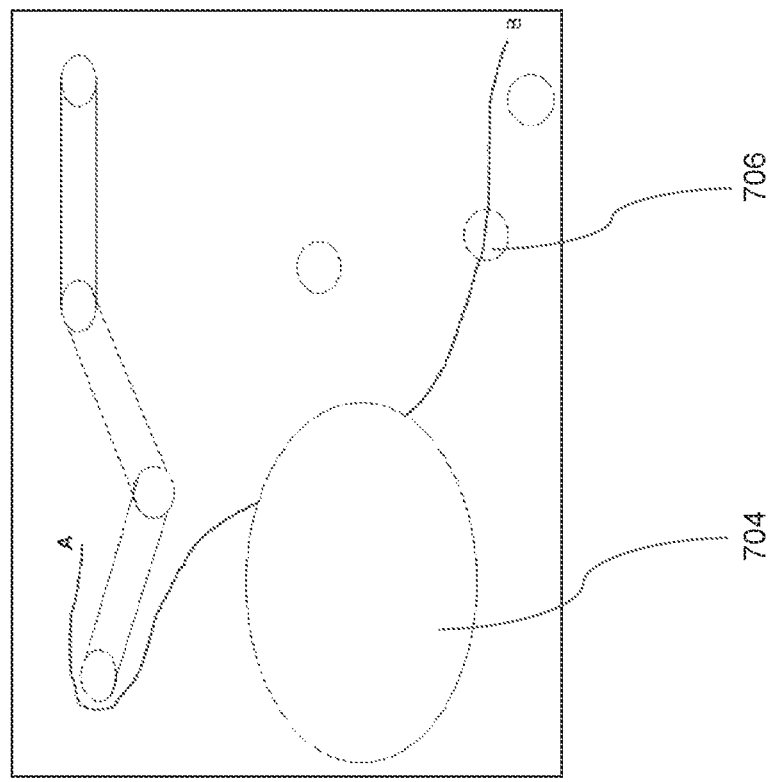

The database may be coupled with a graphical user interface (GUI), as mentioned herein. The GUI may be shown on display of a user interface (e.g., screen). For example, the user interface may access a browser or an application to access information contained in the database. The user interface may display a two-dimensional or three-dimensional representation of flight restriction regions on a map (e.g. a global map). FIG. 7 provides a user interface including a two-dimensional view 702 and a user interface including a three-dimensional view 710 of flight restriction regions. The user interface may further display parameters associated with the flight restriction regions (e.g., a global coordinate, street address, flight response measure, etc). The user interface may be interactive. For example, it may be possible for a user to input flight restriction regions through the user interface as described herein. The user interface may be accessible on a website associated with the database. The user interface may be accessible through an application (e.g., application on a mobile device). The website or application may further be coupled to a UAV. For example, a UAV may utilize the user interface in inputting personal flight restriction regions in which a UAV operator does not want the UAV to fly in. For example, a UAV operator may not want the UAV to fly in a region known for unfavorable conditions (e.g., known for strong winds, near borders, too far out from the shoreline, near important governmental buildings, near unruly neighbors, etc).

The user interface may be utilized in planning and/or displaying a flight route of the UAV. A flight route may be generated on the user interface. The flight route may be automatically generated or manually generated. For example, a flight route may be manually generated based on a user tracing the flight route on the two-dimensional view or three-dimensional view of the user interface. The user may not be allowed to draw or trace through flight restriction regions (e.g., no fly zones). The user may be allowed to draw or trace through flight restriction regions. For example, the user may draw freehand on the user interface displaying flight restriction regions. A user may submit a proposed flight route which may be reviewed by an operator or automatically with aid of one or more processors. The proposed flight route may be accepted, rejected, or modified by an operator or automatically. Alternatively or in conjunction, a flight route may be automatically generated based on the three-dimensional space of the flight restriction regions. For example, a user may input a desired starting point A and a desired ending point B. Based on points A and B, a flight route may be automatically generated, taking into account the three dimensional space of the flight restriction regions. Taking into consideration the three dimensional space may enable novel flight routes. For example, in the two-dimensional representation 702, the flight route from point A to point B seemingly encroaches upon flight restriction region 704 and 706. In the three-dimensional view 710, it can be seen that the flight route goes around the flight restriction region 712 and over flight restriction region 714. Taking into consideration the three-dimensional space of flight restriction regions may enable more efficient planning of flight routes, which may be utilized in a variety of application, such as automatic delivery of goods.

Figure 8:
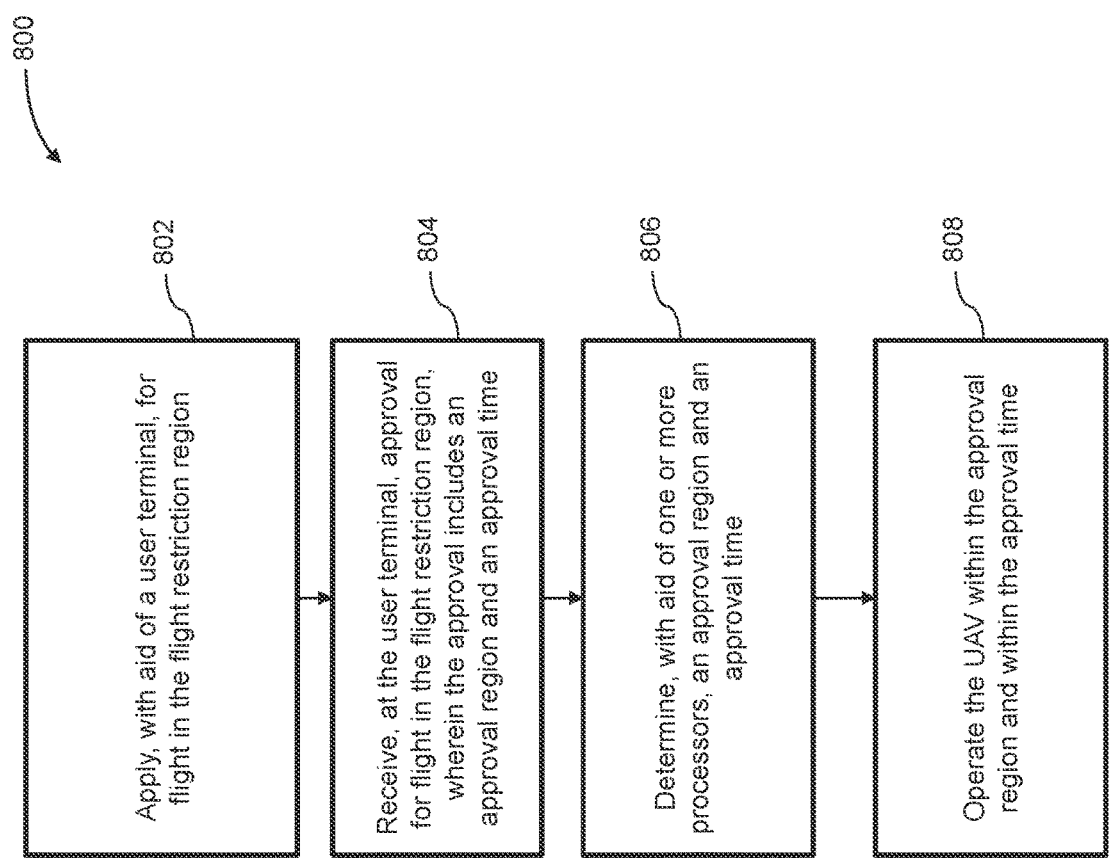
FIG. 8 provides a method of operating a UAV in a flight restriction region, in accordance with embodiments.

FIG. 8 provides a method 800 of operating a UAV in a flight restriction region, in accordance with embodiments. In step 802, flight in the flight restriction region may be applied for with aid of a user terminal. The user terminal may be, for example, a mobile device, such as a cell phone, PDA, or tablet. The user terminal may be, for example, a remote controller. The user terminal may comprise a display unit. The display unit may display a user interface (e.g., two-dimensional or three-dimensional representation of flight restriction regions on a map) as described herein. The user interface may be accessed through an application or a website. The user interface may be interactive. For example, a UAV operator may select a flight restriction region on the user interface via pointer selection (e.g., mouse pointer) or finger touch and apply for flight within the region.

Optionally, applying for flight in the flight restriction region may include applying for a permitted flight time. The permitted flight time may be temporary, or indefinite. For example, the permitted flight time may be about or less than 1 minute, 2 minute, 5 minutes, 10 minutes, 15 minutes, 30 minutes, 60 minutes, 120 minutes, 180 minutes, 6 hours, 12 hours, 1 day, 1 week, 1 month, or indefinite. Applying for flight in the flight restriction region may include applying for a permitted flight region. The permitted flight region may be defined by a three-dimensional shape. The permitted flight region may be equal to the flight restriction region. The permitted flight region may be a subset of the flight restriction region (e.g., smaller than the flight restriction region). For example, the region within the flight restriction region may be defined by a narrow strip above a certain altitude (e.g., 100 m).

Optionally, applying for flight in the flight restriction region may include applying for a permitted flight response measure. For example, a UAV operator may propose a permitted flight measure to be subject to while within the flight restriction region. The permitted flight response measure may be selected from a list of flight response measures. The permitted flight response measure may be selected automatically with aid of one or more processors, without requiring use input. In some instances, some user input may be provided, but one or more processors may make the final determination of the flight response measures. For example, a UAV operator may propose to fly above a certain altitude while in the flight restriction region. For example, a UAV operator may propose to turn off sensors on the UAV while in the flight restriction region.

In step 804, approval for flight in the flight restriction region may be received at the user terminal. The approval may be given by a third party. The third party may be a person that exercises control over the flight restriction region, substantially as described herein. The third party may be a person associated with the database. If a permitted flight region, permitted flight time, or permitted flight response measure had been applied for in step 802, the third party may accept (e.g., approve) or reject. If a permitted flight region, permitted flight time, or permitted flight response measure had been applied for in step 802, the third party may accept but designate its own permitted flight time, permitted flight region, and/or permitted flight response measure. If no permitted flight region or permitted flight time had been applied for in step 802, the third party may accept or reject. If no permitted flight region or permitted flight time had been applied for in step 802, the third party may accept but designate its own permitted flight time, permitted flight region, and/or permitted flight response measure. Receiving an approval may comprise receiving a notification of approval. For example, the user terminal may send an alert that an approval was received. The alert may be visual, tactile, auditory, and the like.

In step 806, an approval region and an approval time may be determined with aid of one or more processors. For example, the one or more processors may determine the approval region to be equal a permitted flight region (either applied for with aid of a user terminal, or offered by the third party). For example, if no approval region had been applied been applied for or offered by the third party, the one or more processors may determine the approval region (e.g., from a predetermined list, according to preset configurations, according to conditions, etc). The approval region may be defined by a three-dimensional shape. The approval region may be a subsection of the flight restriction region (e.g., smaller than the flight restriction region). For example, the one or more processors may determine the approval time to be equal a permitted flight time (either applied for with aid of a user terminal, or offered by the third party). For example, if no approval time had been applied been applied for or offered by the third party, the one or more processors may determine the approval time (e.g., from a predetermined list, according to preset configurations, according to conditions, etc). The approval time may be about or less than 1 minute, 2 minute, 5 minutes, 10 minutes, 15 minutes, 30 minutes, 60 minutes, 120 minutes, 180 minutes, 6 hours, 12 hours, 1 day, 1 week, 1 month, or indefinite.

In step 808, the UAV may be operated within the approval region and within the approval time. If a permitted flight response measure had been applied for and approved of, or designated, the UAV may operate under the permitted flight response measures. The user terminal may send a signal to the UAV conveying the approval time and/or the approval region. The UAV may send a confirmation back to the user terminal that the approval time and/or the approval region was received. A UAV operating outside the approval region and/or outside the approval time may be subject to one or more flight response measures associated with the flight restriction regions. For example, if the approval time expires while the UAV is within the approval region, the UAV may automatically descend and land. Alternatively, the UAV may automatically fly away from the flight restriction region. For example, if the UAV flies outside of the approval region (but is still within the flight restriction region), the UAV may automatically descend and land, the UAV operator may receive warning signals, etc.

Figure 9:
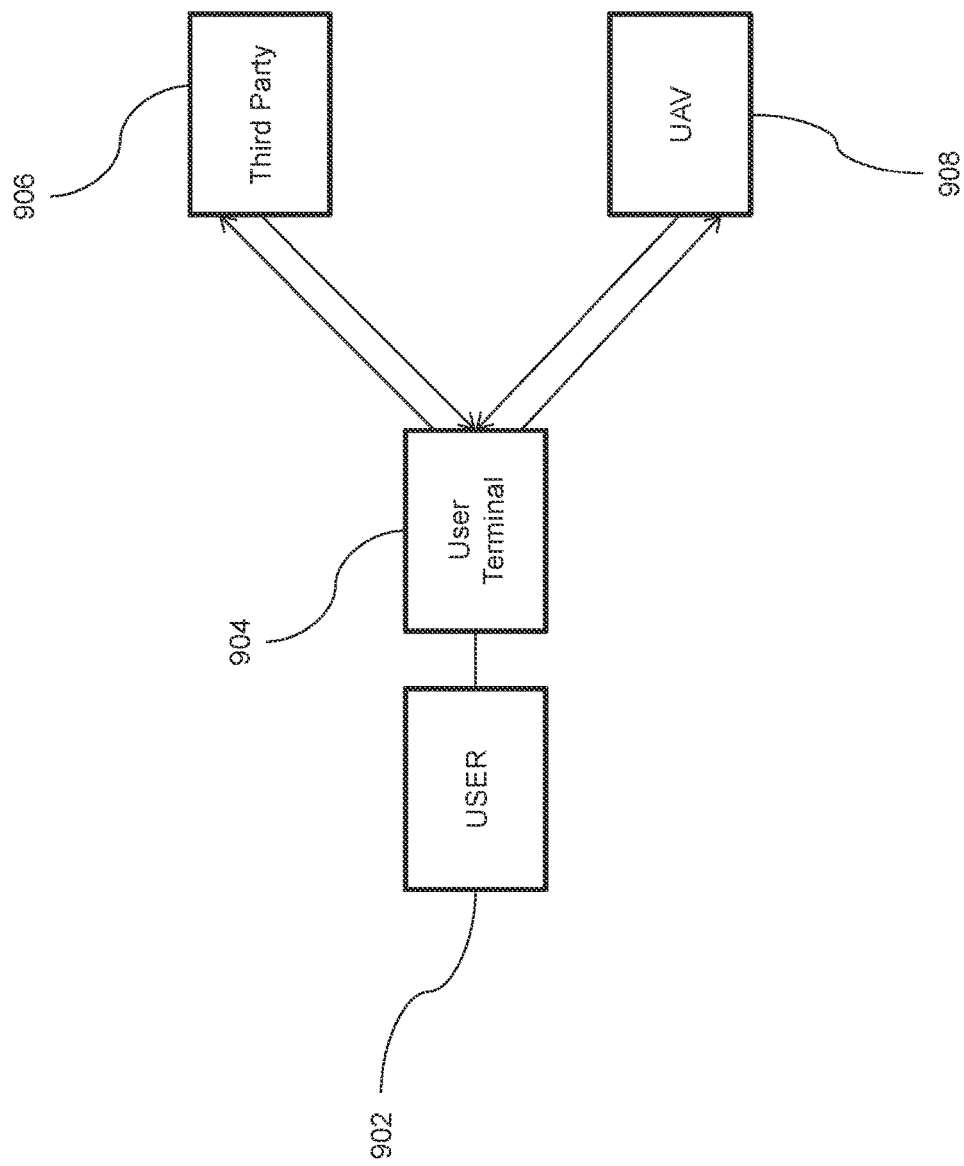
FIG. 9 illustrates a schematic for UAV flight within a flight restriction region, in accordance with embodiments.

FIG. 9 illustrates a schematic for UAV flight within a flight restriction region, in accordance with embodiments. A user 902 may apply for flight in a flight restriction region via a user terminal 904. The user terminal may apply for flight in the flight restriction region by communicating with a database for managing flight restriction regions or by communicating with third parties (e.g., through the database). For example, the user terminal may include a website or application in which it can send inquiries to the database or third parties associated with the flight restriction region. In applying for flight within the flight restriction region, the user may provide a variety of information. For example, a user may provide a real name, a reason for applying for flight within the flight restriction region, a desired permitted flight time or permitted flight region as described herein, and the like. A third party 906 may approve of or deny the request. The third party may be a human being, a program, entity, or a device. Alternatively or in conjunction, the third party may designate its own permitted flight region and permitted flight time. After approval, the user terminal, with aid of one or more processors, may determine an approval region and an approval time, as described herein. The approval region and approval time may be communicated to the UAV or a UAV flight controller 908 by the user terminal. The UAV flight controller may optionally send back a confirmation feedback to the user terminal.

Figure 10:
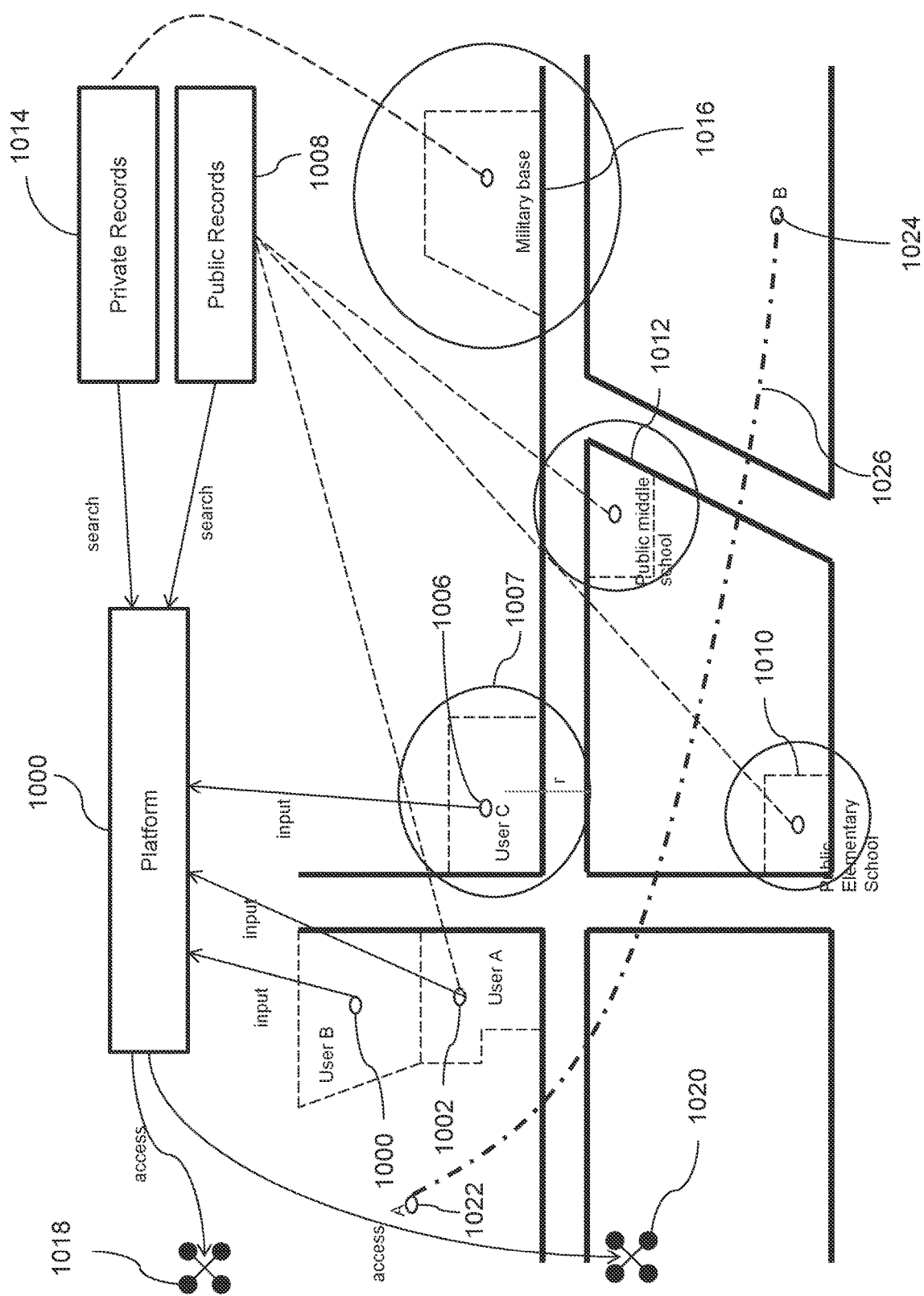
FIG. 10 provides a platform for managing flight restriction, in accordance with embodiments.

FIG. 10 provides a platform 1000 for managing flight restriction regions, in accordance with embodiments. The platform may interact with various users, external data sources, UAVs, or UAV operators. The platform may provide an interface for various users to input flight restriction regions. The platform may receive input designating parameters of flight restriction regions from a plurality of users (e.g., user A, B, and C) via user input devices. For example, user A, a homeowner, may input a location of his home 1002. For example, user B, a private park employee, may input a location of a park 1004. For example, user C, an aid to a government representative, may input a location 1006 where a speech by the government representative will be taking place. User C may also input a desired radius r of a flight restriction region. Based on the input parameters of flight restriction regions, a flight restriction region may be determined. For example, based on inputs by user C, flight restriction regions 1007 may be determined. The platform may be used to aggregate the inputs from the various users. The platform may also comprise or be associated with an authentication (e.g., verification) mechanism, or an approval process as described herein. The proposed parameters of flight restriction regions by users may be approved of or denied based on the approval process.

The platform may additionally gather additional information regarding parameters of flight restriction regions. The platform may gather information regarding parameters of other flight restriction regions, or other parameters of the user input flight restriction regions. In some instances, the platform may sequentially gather information before, or after receiving input from the users. In some instances, the platform may simultaneously gather information while receiving input from the users. The platform may aggregate the information regarding parameters of other flight restriction region or other parameters of the user input flight restriction regions along with the user input parameters. For example, the platform may search public records 1008 for information associated with flight restriction regions input by user A, B, or C. For example, the platform may search public records for property boundary lines of user A. For example, the platform may search public records for information regarding public schools 1010, 1012 and parameters of flight restriction regions regarding public schools (e.g., location, boundary, etc) may be uploaded to the database. For example, the platform may search private records 1014 for information regarding military bases 1016 and parameters of flight restriction regions regarding military bases (e.g., location, boundary, etc) may be uploaded to the database. A flight restriction region may be determined based on the gathered information associated with flight restriction regions (e.g., other flight restriction regions or flight restriction regions associated with those input by a user).

The platform may record or store the parameters of flight restriction regions in a database (e.g., using one or more memory units). The database may or may not come preloaded with parameters of flight restriction regions. For example, the database may contain the locations of all existing airports and flight restriction regions associated with it. The database may be further updated with the user input (e.g., parameters of flight restriction regions) or other parameters regarding the flight restriction regions or parameters regarding other flight restriction regions gathered from external data sources. The update may happen in real time, or at predetermined time intervals, as described herein.

The platform may visually display the flight restriction regions within the database (e.g., on a display unit). For example, a user terminal such as a mobile device or computer may comprise a display unit. The visual display may be utilized by users to view the currently existing flight restriction regions. The visual display may be utilized by users to propose parameters of flight restriction regions. The visual display may comprise a user interface in which flight restriction regions can be generated and/or manipulated (e.g., by drawing, tracing, selecting flight restriction regions, etc). The visual display may be utilized by UAV operators to plan UAV operations.

The flight restriction regions (e.g., parameters relating to the flight restriction regions) contained in the database may be accessed or downloaded by a UAV 1018, 1020. The UAV may utilize the information in operating a UAV. For example, UAV 1018 may undertake appropriate flight response measures associated with the flight restriction regions. For example, UAV 1018 may avoid entering restriction region 1007. For example, UAV 1018 may enter the flight restriction region associated with 1010 only during after school hours. The downloaded flight restriction regions may be displayed on a display unit as mentioned herein. The three-dimensional flight restriction regions may be utilized in automatically generating a flight path that takes into account the three-dimensional boundaries of flight restriction regions. For example, given a starting point A 1022 and desired ending point B 1024, one or more processors may automatically generate a flight route 1026 that does not encroach upon flight restriction regions displayed on a display map. The platform may be utilized by UAV operators in gaining access to flight restriction regions. For example, a UAV operator may ask for access to the flight restriction region and the restriction may be lifted permanently or temporarily.

The systems, devices, and methods described herein can be applied to a wide variety of movable objects. As previously mentioned, any description herein of a UAV may apply to and be used for any movable object. Any description herein of a UAV may apply to any aerial vehicle. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3. Conversely, the total volume of the movable object may be greater than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3.

In some embodiments, the movable object may have a footprint (which may refer to the lateral cross-sectional area encompassed by the movable object) less than or equal to about: 32,000 cm2, 20,000 cm2, 10,000 cm2, 1,000 cm2, 500 cm2, 100 cm2, 50 cm2, 10 cm2, or 5 cm2. Conversely, the footprint may be greater than or equal to about: 32,000 cm2, 20,000 cm2, 10,000 cm2, 1,000 cm2, 500 cm2, 100 cm2, 50 cm2, 10 cm2, or 5 cm2.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 11:
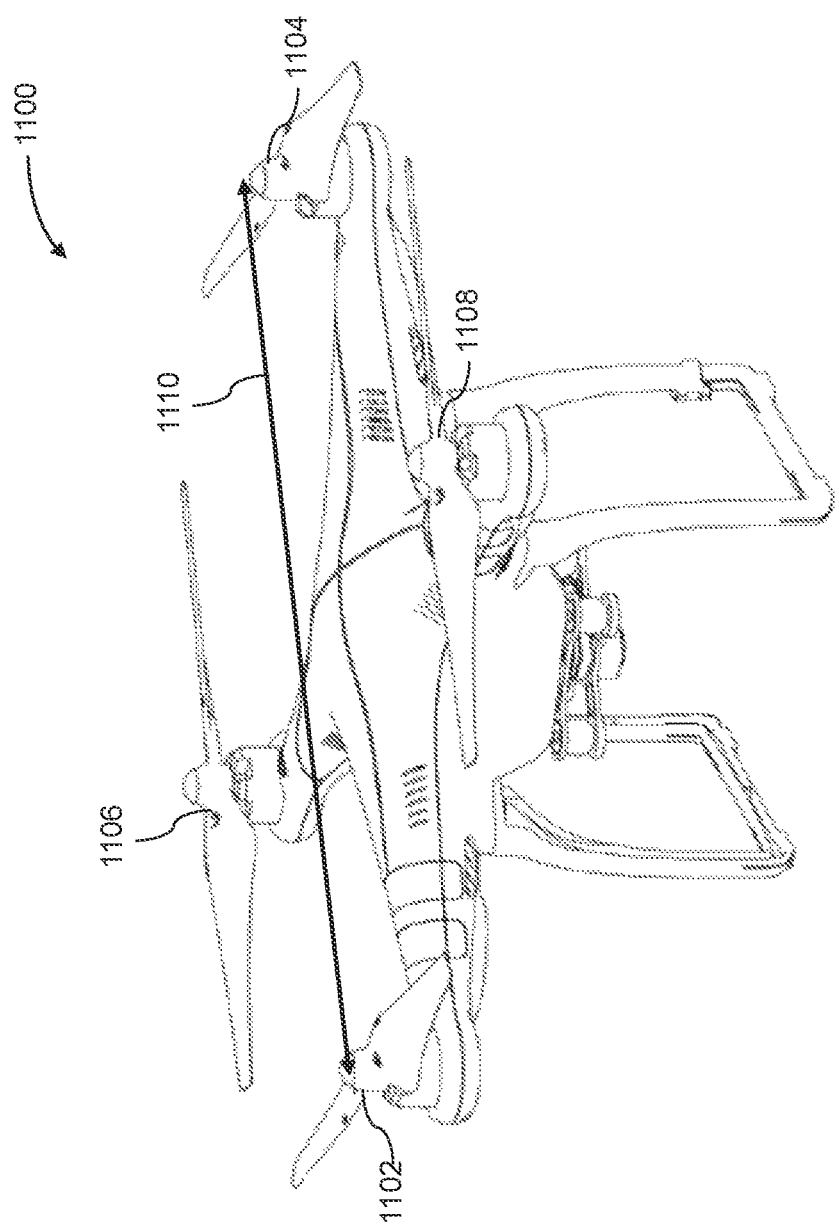
FIG. 11 illustrates an unmanned aerial vehicle (UAV), in accordance with embodiments of the present disclosure.

FIG. 11 illustrates an unmanned aerial vehicle (UAV) 1100, in accordance with embodiments of the present disclosure. The UAV may be an example of a movable object as described herein. The UAV 1100 can include a propulsion system having four rotors 1102, 1104, 1106, and 1108. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1110. For example, the length 1110 can be less than or equal to 1 m, or less than equal to 5 m. In some embodiments, the length 1110 can be within a range from 1 cm to 7 m, from 70 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
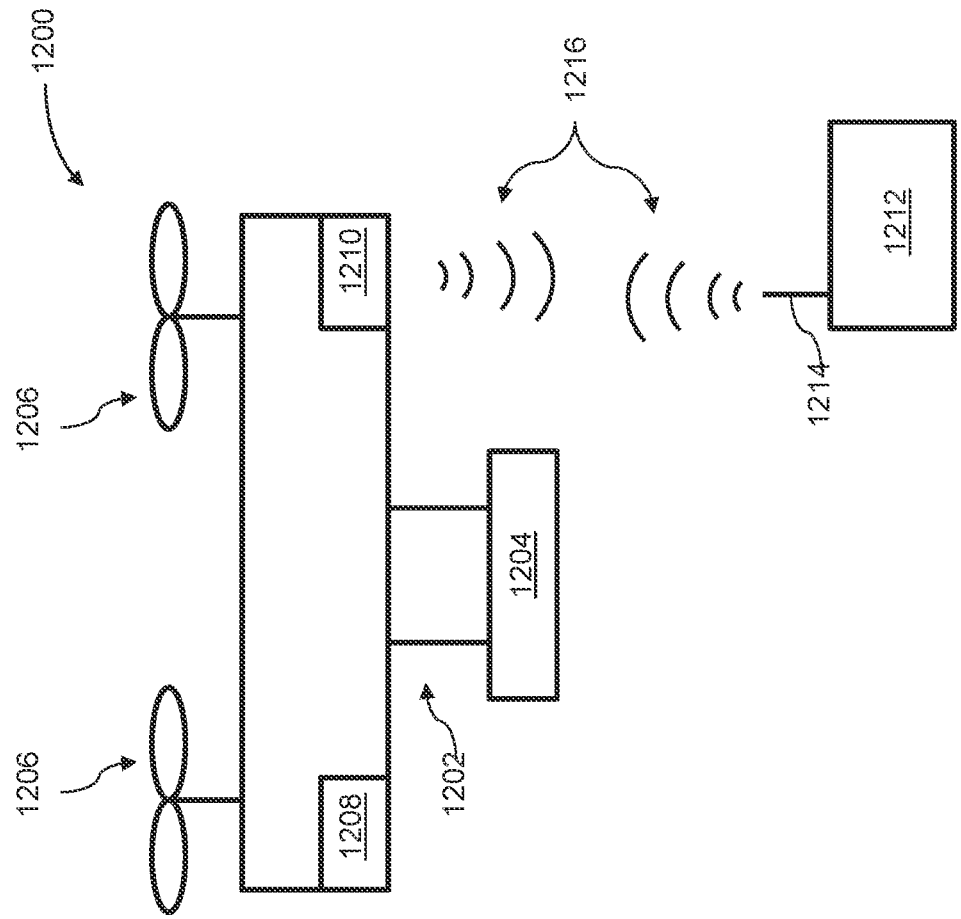
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1212.

The propulsion mechanisms 1206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication, such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
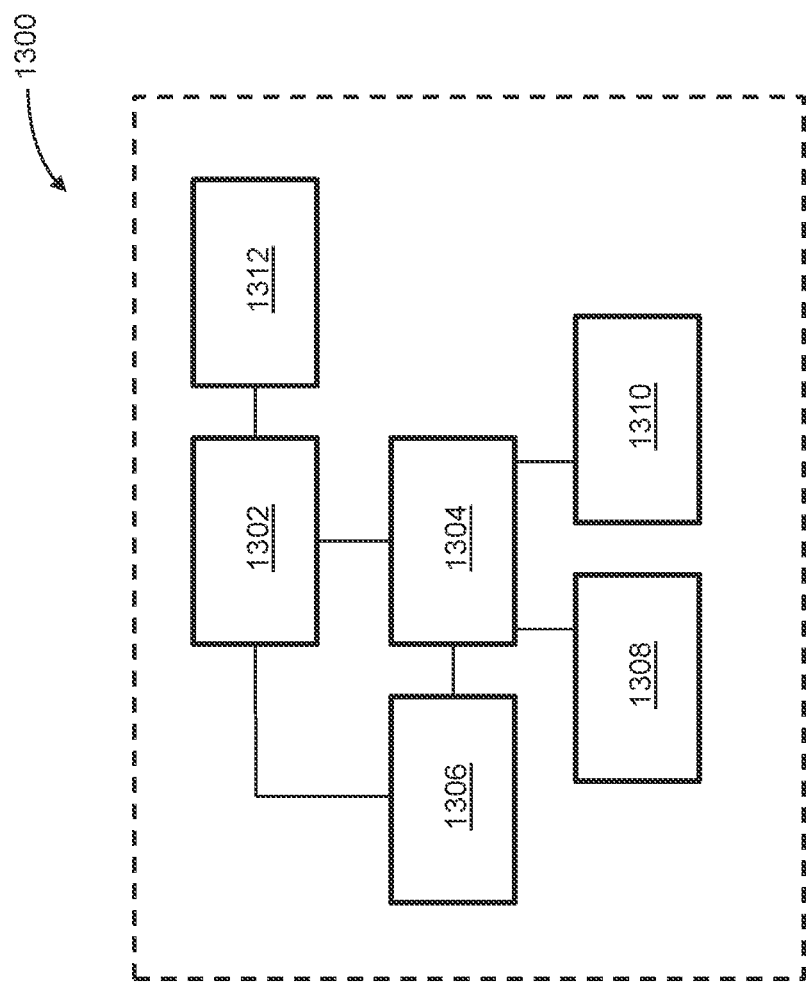
FIG. 13 is a schematic illustration by way of block diagram of a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable processor (e.g., a central processing unit (CPU)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. For example, the processing unit 1304 can be configured to execute instructions causing one or more processors of the processing unit 1304 to analyze sensing data produced by the sensing module. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A system for managing a restriction region, the system comprising:
one or more processors configured to:
receive one or more parameters of a designated restriction region for a vehicle, wherein: the one or more parameters are input by a user via a user interface, and the one or more parameters include a duration or time period over which the designated restriction region is restricted;
authenticate, based on the one or more parameters, an identity of the user to determine whether the user is authorized to designate the restriction region, wherein a longer duration or time period which the designated restriction region is restricted corresponds to a higher degree of authentication;
in response to determining the user is authorized to designate the restriction region, store the one or more parameters of the designated restriction region to a database;
associate one or more response measures with the designated restriction region based on the one or more parameters; and
implement the one or more response measures to affect operation of the vehicle along a travel path when the vehicle is within or near the designated restriction region in the duration or time period.

2. The system of claim 1, wherein implementing the one or more response measure to affect operation of the vehicle includes at least one of (a) forcing the vehicle to change direction of movement away from the designated restriction region, (b) forcing the vehicle to stop, or (c) providing an alert.

3. The system of claim 1, wherein the one or more processors are further configured to:
determine, from multiple degrees or types of authentication, a degree or type of authentication corresponding to the one or more parameters, and wherein authenticating the identity of the user is based on the determination.

4. The system of claim 1, wherein the identity of the user is authenticated using a password, a phrase, or a code entered by the user, or using biometric input from the user.

5. The system of claim 1, wherein the one or more parameters of the designated restriction region further include a location associated with a private property or a commercial region.

6. The system of claim 5, wherein the one or more processors are configured to determine the user is authorized to designate the restriction region when the identity of the user is authenticated as an owner, a manager, or an authorized personnel of the private property or the commercial region.

7. The system of claim 1, wherein the one or more processors are further configured to:
display the designated restriction region at the user interface.

8. The system of claim 1, wherein:
implementing the one or more response measures is performed when the vehicle is determined to be an unauthorized vehicle; and
the vehicle is allowed to operate within or near the designated restriction region when the vehicle is determined to be an authorized vehicle.

9. The system of claim 1, wherein the duration or time period is associated with at least one of:
a special or non-regular event, or
a recurring or regular event having a corresponding predetermined length.

10. The system of claim 1, wherein the one or more parameters further include boundary information of the designated restriction region, and wherein the one or more processors are further configured to:
associate the duration or time period with the boundary information such that boundaries of the designated restriction region are removed or shrunk outside the duration or time period.

11. The system of claim 1, wherein the database is a temporary database.

12. The system of claim 1, wherein the database is a private database that is privately accessible with granted access, or a public database that is publicly accessible over the Internet.

13. The system of claim 1, wherein the one or more parameters of the designated restriction region include at least a location, and the one or more processors are further configured to:
access information associated with the designated restriction region from one or more third party data sources based on the location.

14. The system of claim 13, wherein the one or more third party data sources are private data sources that are privately accessible with granted access, or public data sources that are publicly accessible over the Internet.

15. The system of claim 13, wherein the one or more third party data sources include government data sources, public records, or sources that list airport information, military bases, jurisdictional border, or public sensitive areas.

16. The system of claim 13, wherein the information includes one or more response measures associated with the designated restriction region that are extracted from the one or more third party data sources.

17. A system for managing a restriction region, the system comprising:
one or more processors configured to:
receive one or more first parameters of a designated restriction region for a vehicle, the one or more first parameters being input by a first user via a user interface;
authenticate, based on the one or more first parameters, an identity of the first user to determine whether the first user is authorized to designate the restriction region;
in response to determining the first user is authorized to designate the restriction region, store the one or more first parameters of the designated restriction region to database;
receive one or more second parameters of the designated restriction region input by a second user via the user interface;
authenticate, based on the one or more second parameters, an identity of the second user to determine whether the second user is authorized to designate the restriction region;
aggregate the one or more first parameters and the one or more second parameters to generate one or more aggregated parameters, wherein the one or more first parameters or the one or more second parameters include a duration or time period over which the designated restriction region is restricted, and a longer duration or time period which the designated restriction region is restricted corresponds to a higher degree of authentication;
store the one or more aggregated parameters of the designated restriction region to the database;
associate one or more response measures with the designated restriction region based on the one or more parameters; and
implement the one or more response measures to affect operation of the vehicle along a travel path when the vehicle is within or near the designated restriction region.

18. The system of claim 17, wherein the one or more processors are further configured to:
associate one or more response measures with the designated restriction region based on the one or more parameters; and
implement the one or more response measures to affect operation of the vehicle along a travel path when the vehicle is within or near the designated restriction region.

19. The system of claim 18, wherein implementing the one or more response measure to affect operation of the vehicle includes at least one of (a) forcing the vehicle to change direction of movement away from the designated restriction region, (b) forcing the vehicle to stop, or (c) providing an alert.

20. A system for managing a restriction region, the system comprising:
one or more processors configured to:
receive one or more parameters of a designated restriction region for a vehicle, wherein: the one or more parameters are input by a user via a user interface, and the one or more parameters include a duration or time period over which the designated restriction region is restricted;
authenticate, based on the one or more parameters, an identity of the user to determine whether the user is authorized to designate the restriction region, wherein a longer duration or time period which the designated restriction region is restricted corresponds to a higher degree of authentication;
in response to determining the user is authorized to designate the restriction region, store the one or more parameters of the designated restriction region to a database;
associate one or more response measures with the designated restriction region based on the one or more parameters; and
send the designated restriction region and the one or more response measures to the vehicle.

* * * * *